US011216081B2

(12) United States Patent
Bieglmayer

(10) Patent No.: US 11,216,081 B2
(45) Date of Patent: Jan. 4, 2022

(54) APPARATUS FOR CAPTURING MOVEMENTS OF A PERSON USING THE APPARATUS FOR THE PURPOSES OF TRANSFORMING THE MOVEMENTS INTO A VIRTUAL SPACE

(71) Applicant: Cybershoes GmbH, Vienna (AT)

(72) Inventor: Michael Bieglmayer, Vienna (AT)

(73) Assignee: CYBERSHOES GMBH, Vienna (AT)

( * ) Notice: Subject to any disclaimer, the term of this patent is extended or adjusted under 35 U.S.C. 154(b) by 0 days.

(21) Appl. No.: 16/484,434

(22) PCT Filed: Feb. 8, 2018

(86) PCT No.: PCT/EP2018/053233
§ 371 (c)(1),
(2) Date: Aug. 7, 2019

(87) PCT Pub. No.: WO2018/146231
PCT Pub. Date: Aug. 16, 2018

(65) Prior Publication Data
US 2020/0033957 A1 Jan. 30, 2020

(30) Foreign Application Priority Data

Feb. 8, 2017 (DE) ............ 10 2017 102 422.0
May 11, 2017 (DE) ............ 10 2017 110 186.1

(51) Int. Cl.
*G06F 3/01* (2006.01)
*G06F 3/033* (2013.01)
*G06F 3/0346* (2013.01)

(52) U.S. Cl.
CPC ............ *G06F 3/0334* (2013.01); *G06F 3/011* (2013.01); *G06F 3/0346* (2013.01); *G06F 2203/012* (2013.01)

(58) Field of Classification Search
CPC .......... G06F 3/011–012; G06F 3/0334; G06F 3/034
See application file for complete search history.

(56) References Cited

U.S. PATENT DOCUMENTS 5,515,078 A 5/1996 Greschler et al.
5,886,685 A * 3/1999 Best ................... G06F 3/0334
345/163

(Continued)

FOREIGN PATENT DOCUMENTS

DE 3004096 A1 8/1980
DE 102005038960 A1 3/2007

(Continued)

OTHER PUBLICATIONS

Per Øie: "Move Stehstuhl", <<https://www.balans-online.de/site/assets/files/1400/move_pfs_en.pdf>> Jan. 1, 1985 (found on Mar. 15, 2021). pp. 1-5, English computer translation pp. 6-11.

*Primary Examiner* — Roy P Rabindranath
(74) *Attorney, Agent, or Firm* — Seed IP Law Group LLP

(57) ABSTRACT

Apparatus for detecting movements of a person using the apparatus for the purpose of transforming the movements into a virtual space, comprising a seat (110; 210; 410), sensors which detect the movements of the feet of the person using the apparatus, and cyber foot covers (50a; 50b; 50c; 50d) for receiving at least one of the sensors. The seat (110; 210; 410) comprises a support member (103; 203) adapted in that a seat element (105; 205), on which the person using the apparatus can sit, is attachable to an upper portion of the support member (103; 203) and in that the load of the seat element (105; 205) is received substantially along a vertically arranged longitudinal axis of the support member (103; 203) and transferred downwards to a ground. The seat (110; 210; 410) is rotatably arranged relative to the ground and is shaped such that at least a movement of the legs from the knee to the distal end of the legs of the person using the (Continued)

apparatus is allowed. The cyber foot covers (50*a*; 50*b*; 50*c*; 50*d*) each have a sole (58; 71) and fastening means (61; 62; 74; 76) with which the cyber foot covers (50*a*; 50*b*; 50*c*) can be fastened to the legs of the person using the apparatus. The sole (58; 71) of the cyber foot covers (50*a*; 50*b*; 50*c*; 50*d*) is curved so as to allow a continuous sliding rolling movement of the feet of the person using the apparatus during movement of the legs of the person using the apparatus.

3 Claims, 14 Drawing Sheets

(56) References Cited

U.S. PATENT DOCUMENTS

| | | | |
|---|---|---|---|
| 5,980,256 A | 11/1999 | Carmein | |
| 6,016,385 A | 1/2000 | Yee et al. | |
| 9,239,616 B1 | 1/2016 | Carrell | |
| 9,329,681 B2 | 5/2016 | Goetgeluk | |
| 2004/0001075 A1* | 1/2004 | Balakrishnan | G06F 3/04845 |
| | | | 345/653 |
| 2006/0262120 A1* | 11/2006 | Rosenberg | G06F 3/011 |
| | | | 345/473 |
| 2007/0003915 A1* | 1/2007 | Templeman | G06F 3/011 |
| | | | 434/247 |
| 2008/0218472 A1* | 9/2008 | Breen | G06F 3/015 |
| | | | 345/156 |
| 2010/0024252 A1* | 2/2010 | Sveen | A43B 5/06 |
| | | | 36/103 |
| 2012/0291564 A1* | 11/2012 | Amos | A43B 3/0005 |
| | | | 73/862.045 |
| 2017/0242477 A1 | 8/2017 | Rubin et al. | |
| 2017/0300132 A1* | 10/2017 | Hiroi | G06F 3/0338 |
| 2020/0100562 A1* | 4/2020 | Brown | A43B 13/14 |

FOREIGN PATENT DOCUMENTS

| | | |
|---|---|---|
| DE | 202007011704 U1 | 12/2007 |
| EP | 2476331 A1 | 7/2012 |
| WO | 2006/090197 A1 | 8/2006 |
| WO | 2017/019884 A1 | 2/2017 |
| WO | 2017/087883 A1 | 5/2017 |

* cited by examiner

APPARATUS FOR CAPTURING MOVEMENTS OF A PERSON USING THE APPARATUS FOR THE PURPOSES OF TRANSFORMING THE MOVEMENTS INTO A VIRTUAL SPACE

The invention concerns an apparatus for detecting movements of a person using the apparatus for the purpose of transforming the movements into a virtual space. The apparatus comprises a seat which is rotatable relative to a ground and on which the person using the apparatus can sit, the seat being designed to allow at least a movement of the legs from the knee to the distal end of the legs of the person using the apparatus, and sensors which detect the movements of the feet of the person using the apparatus. The invention also concerns a system for detecting movements of a person using the system and transforming the movements into a virtual space. The system contains the inventive apparatus and is arranged to convert the movements of the feet detected by the sensors into a synchronous, direction-identical and speed-identical locomotion of a virtual avatar in virtual space, whereby the virtual avatar can be represented in a virtual space displayed on a display means.

U.S. Pat. No. 9,329,681 B2 discloses a system for detecting movements of a person using the system and for transforming the movements into a virtual space in which the person can move in the system in an upright posture by walking. The system consists essentially of a substructure with a concave base which serves as a contact surface for a person using the system and a frame for fixing and stabilizing the person using the system in the pelvic area. The pelvic area is fixed with a belt that surrounds the pelvis. This can give the person a high sense of security.

In the case of the system known from document U.S. Pat. No. 9,329,681 B2, however, it has proved to be disadvantageous that an "entry" into the system and an "exit" from the system is very uncomfortable due to the frame and the belt and therefore time-consuming for the person.

U.S. Pat. No. 5,515,078 A discloses a system for capturing position information and displaying a virtual space based on the position information. The system comprises a computer, a base and a chair, whereby parts of the chair may be changed in position by the user of the system in relation to the base. These changes are recorded by a measuring apparatus. The system further has a monitor attached to the chair that moves with the chair. Joysticks are attached to the chair or monitor. The signals captured by the joysticks and the position measuring apparatus are evaluated by the processor and converted into the virtual space displayed on the monitor.

As a result, the system known from U.S. Pat. No. 5,515,078 A does not directly record the movements of the person using the system, but the movement of the elements of the chair or joystick that changes the person's position. Immersion of a person using a system refers to the person slipping into a virtual body/avatar. There is only minor immersion given in this case, if at all.

Utility model DE 20 2007 011 704 U1 discloses an apparatus for controlling flat or three-dimensional objects which can be displayed on a display by means of a sensor apparatus which detects movements or loads exerted on a seat by a user and/or the movement or loads exerted by a foot of the user. In particular, the sensor apparatus is configured to detect a movement, position, height, acceleration and/or inclination of the seat surface and/or various positions or orientations of the user's foot. The sensor apparatus for recording the positions and orientations of the foot is implemented by a three-dimensionally resilient rocker, which is changed in its position by changing the pressure on the foot.

Consequently, even with this apparatus, the movements of the person using the apparatus are not directly detected, but the movement of elements is detected that move the person. Compared to the aforementioned system, the advantage is that the foot can also be used as an input apparatus, but this only occurs as long as the foot stands on the sensor apparatus. A detection of foot movements when the foot does not stand on the sensor apparatus is not described because the rocker cannot move with the foot. Minor immersion of the person using the system is therefore also given in this case, if at all.

The problem underlying the present invention is to provide an apparatus for detecting movements of a person using the apparatus, in which the movements of the person, in particular the legs or feet of the person, are directly detected, in which the use of fixation means embracing parts of the body is avoided and in which, nevertheless, a large degree of freedom of movement of all the limbs of the person using the apparatus is given.

In accordance with the invention, the problem of the present invention is solved by an apparatus in that the apparatus comprises a seat having a support member, the support member being adapted in that a seat element, on which the person using the apparatus can sit, is attachable to an upper part of the support member, and in that the load of the seat element is received substantially along a vertically arranged longitudinal axis of the support member and transferred downwards to a ground, wherein the seat is rotatably arranged relative to the ground, and wherein the seat is designed to allow at least a movement of the legs from the knee to the distal end of the legs of the person using the apparatus. The apparatus further comprises sensors which detect the movements of the feet of the person using the apparatus and cyber foot covers for receiving at least one of the sensors, wherein the cyber foot covers each have a sole and fastening means with which the cyber foot covers are attachable to the legs of the person using the apparatus, and wherein the sole of the cyber foot covers is curved so as to allow a continuously sliding rolling movement of the feet of the person using the apparatus during movement of the legs of the person using the apparatus.

The invention also concerns a system comprising the apparatus according to the invention, wherein the system is adapted to convert the movements of the feet detected by the sensors into a synchronous, direction-identical and speed-identical locomotion of a virtual avatar in virtual space.

The invention also relates to a method for manufacturing the apparatus according to the invention comprising the steps: providing the seat with the support member that is adapted to attach a seat element to the upper portion of the support member, providing the sensors, and providing the cyber foot covers.

For the sake of simplicity and clarity, the person using the apparatus or system is abbreviated as person.

In preferred embodiments of the invention, the apparatus comprises a seat with a seat element attached to the upper part of the support member.

When using the apparatus according to the invention, the person sits at least partially on the seat, wherein, depending on the shape of the seat element of the seat, at least a movement of the legs from the knee to the distal end of the legs of the person is possible. For example, a seating element with a flat seat surface, such as a normal chair or an office chair, essentially only allows the legs to move from the knee to the distal end of the legs. The person's upper thighs are essentially resting on the seat.

A saddle-shaped seat element, for example, gives the person's legs greater freedom of movement, while the freedom of movement can be maximized with a saddle-shaped seat element. The person's upper thighs lie only slightly or not at all on the seat surface when sitting and the sitting position is much more upright than when sitting on a flat seat surface. The legs can essentially be moved holistically, with the person's legs only slightly bent in the resting position. Theoretically, the seat can be further reduced from the shape of a bicycle saddle, which further increases the freedom of movement of the legs, but no longer provides seating comfort.

Preferably, the seat element is arranged in such a way that the person's upper thighs do not essentially rest on the seat element or do not predominantly rest on it. Alternatively, the person may achieve this result by changing the sitting position on a flat seat surface so that the upper thighs can be moved as freely as possible.

The seat is equipped with a backrest and/or an armrest to increase the safety of the person.

Preferably, the support member is arranged along its longitudinal axis substantially below the center of gravity of the seat element. In some embodiments, the support member is arranged along its longitudinal axis essentially in the middle below the seat element.

Preferably, the support member allows the seat to rotate in relation to the ground. For this purpose, the upper part of the support member is rotatable in relation to the lower part of the support member. The support member may be length-adjustable to adjust the seat height.

The support member preferably comprises a gas pressure spring. The gas pressure spring can be rotated about its longitudinal axis and is adjustable in length.

Preferably, the apparatus according to the invention includes a stand which holds the support member and connects it to the ground. The stand may be a part of the support member.

Preferably, the apparatus according to the invention is arranged in such a way that the stand does not restrict the legroom granted by the seat to the person. In some embodiments, the apparatus is configured such that a base portion of the stand, which provides the stability of the apparatus, is disposed below a person's tread surface around the seat. Alternatively, the tread surface may be implemented as a base portion of the stand.

In some embodiments, the invented apparatus includes a casing covering at least a base portion of the stand. The casing has a recess for passage of the support member and a means for fixing the stand. The tread surface is arranged on the upper side of the casing, so that the casing functions as a pedestal, the laminar expansion thereof being determined at least by the required freedom of movement for the person's legs.

In some embodiments, a swivel chair is used as a seat, for example an office swivel chair, whereby the stand corresponds to the cruciform base of the swivel chair. In order not to restrict the legroom by the cruciform base, the cruciform base of the swivel chair is preferably covered with the casing and fixed inside the casing. The fixing is particularly advantageous if the cruciform base of the swivel chair is fitted with rollers.

For a good walking feeling it is mandatory that the seat height allows a slight bending of the legs. Depending on the height of the person, the intended length of the support member may not be sufficient to prevent the legs from bending too much. In some embodiments, the apparatus has a support member with a length different from the standard dimensioning. Alternatively, the apparatus may be implemented so that the existing support member may be replaced by a support member of a different length. In other embodiments, at least one additional support member, e.g. a longer gas (pressure) spring, is attached to the apparatus for replacement.

In order to simulate the person's walking feeling as realistic as possible, the apparatus according to the invention features cyber foot covers which are put over the person's feet. The sole of the cyber foot covers is curved, allowing the person's feet to move continuously. The curvature of the sole is adjusted according to the shape of the seat and therefore according to the freedom of movement of the person's legs. The cyber foot covers advantageously comprise of any types of shoes, sandals or socks. These can either be pulled directly over a person's foot or pulled over an already worn sock and/or shoe.

The apparatus preferably comprises a tread surface arranged around the seat in such a way that the person's feet can roll over the tread surface. The tread surface may rest on the ground. Alternatively, the tread surface is arranged on a platform, for example, a casing for covering those parts of the apparatus which provide the stability of the apparatus and otherwise restrict freedom of movement if they were arranged above the tread surface.

If the ground or the tread surface around the seat is smooth, the soles of the cyber foot covers are advantageously covered with a textile in the form of a carpet. If the ground or the tread surface has a surface implemented by a textile, for example, a carpet, it is advantageous that the sole is particularly smooth and made of metal and/or plastic, in particular PE, PEHD, POM or PA. This has the advantage that despite physical contact between the cyber foot cover and the ground, the legs or feet of the person can be moved without great effort and that the system is very quiet.

The movements of the person, in particular the legs or feet, are detected by sensors which are arranged decentralized with respect to the person and/or by sensors which the person wears on his body in an operating mode. The sensors arranged decentralized with respect to the person may, for example, comprise of at least one optical sensor, in particular at least one infrared based optical sensor. In this context, active and/or passive motion capture markers are attached to the person's clothing and/or to the cyber foot covers. With active motion capture markers, it is also possible that only one light laser unit is attached externally to the person, whereby this is implemented to emit various light pulses. The light pulses are captured by the active motion capture markers, which may be used to calculate the person's movements. Sensors carried by the person on the body may include, for example, magnetic sensors, acceleration sensors, proximity sensors and/or optical sensors. Magnetic sensors, acceleration sensors, proximity or distance sensors and/or optical sensors in the cyber foot covers are advantageous. It is also possible that the tread surface or ground is pressure-sensitive.

The advantages of the apparatus according to the invention are that the sitting posture allows a safe sitting position and an essentially free movement of the legs and free movement of the hands. The apparatus according to the invention does not require the person to be supported by his hands and by additional fixation means wrapped around body parts to stabilize the person. As a result, the comfort of getting into and out of the apparatus is also very high and the person can move his hands freely. In the system according to the invention, the person essentially only has to sit down or stand up. This also has the advantage that people do not have to be instructed on the apparatus, but can use it intuitively.

The sole of the cyber foot cover may contain at least one rolling element. The at least one rolling element is advantageously implemented by a roller or a sphere and is supported by bearings in the cyber foot covers. Preferably, a rotation angle of the at least one rolling element is detected by means of a rotation angle sensor, in particular a Hall effect sensor. This has the advantage that the at least one rolling element reliably detects a speed of the cyber foot cover when the foot is placed on the ground, and the speed is zero when the foot is lifted from the ground after the at least one rolling element has run out. In this context, the cyber foot cover has advantageous adjusting elements, for example, in the form of adjusting screws or foam pads, which act on the at least one rolling element as a brake. A run-out time of the at least one rolling element is adapted to a position of the at least one rolling element on the sole. The greater the distance between the tip of the person's foot and the rolling element, the longer the deceleration time.

If each of the cyber foot covers have only one rolling element, this is preferably located near a rear third part point of the underside of the sole of the cyber foot cover. The rolling element preferably protrudes about 2 millimeters over a smooth rounded underside of the sole of the cyber foot covers. This has the advantage that the cyber foot covers can glide easily on a ground or tread covered with carpet or other textile. A carpet or textile has the advantage of having a pile height such that the rolling element can easily press itself into the carpet, so that the rolling element has the longest possible contact with the ground or tread surface when the person walks.

It is an essential feature of the invention that the curvature of the sole of the cyber foot cover, whether in longitudinal or transverse direction, is matched to the design of the seat. The slightly elevated sitting position of the person as compared to a conventional chair means that when the legs are moved, a feeling of walking can be established even though the person is sitting. In contrast to a conventional chair, only a slight angulation of the person's legs is given and thus a high degree of mobility of the upper thighs is achieved, just like when walking. As the stability of the person is achieved by sitting, the cyber foot covers may be adjusted to a particularly smooth rolling motion, because the performed walking movement does not have to serve to support the stability of the person. The cyber foot cover and seat thus interwork in a synergistic manner and allow the apparatus to be used without the use of fixation means wrapped around parts of the body.

It is important that the movements detected by the sensors are transferred into virtual reality in real time in order to experience the virtual reality as particularly real and close to the body. If the conversion of the movement of the person using the system is inaccurate, delayed or strongly abstracted, nausea (VR nausea) occurs in many people after a short time when using the system. Preferably, a linear connection is established between the movement of the legs and the movement in virtual space, whereby the experience is particularly direct and real.

In addition, the advantages of the inventive system are that a forward and/or backward movement in virtual space may be triggered directly by the person's feet moving forward and/or backward. Whereby the forward and/or backward movement of an avatar in the virtual space is only carried out when the ground is in contact with a real foot movement.

In some embodiments, the inventive apparatus is implemented as a kit that can be assembled by an assembler.

This allows the assembler to integrate a provided seating element into the fixture. The inventive method of manufacturing an apparatus for detecting movements of a person using the apparatus may therefore be extended by the following preparatory steps: Providing the seat element, and mounting the seat element on the upper part of the support member.

The seat element represents a seat surface which the fitter can remove from an existing seat and mount on the support member of the apparatus according to the invention. The inventive method of manufacturing an apparatus for detecting movements of a person using the apparatus may be extended by the following preparatory steps: Providing a seat with the seat element, and removing the seat element from the seat.

In some embodiments, the kit can be assembled using a seat provided. The seat provided may be a swivel chair with a base, the base of the seat provided corresponding to the stand of the apparatus. Preferably, the kit intended to include a seat provided shall include a casing covering any elements restricting the freedom of movement of the person's legs below the tread, such as the base. The tread surface is arranged on the upper side of the casing so that the casing functions as a pedestal, the area of which is defined at least by the required tread surface. The casing has a recess for the support member and a means for fixing the stand.

The inventive method of manufacturing an apparatus for detecting movements of a person using the apparatus, including a seat provided, comprises the following steps: providing the seat, which may be implemented as a swivel chair with a base, and placing the casing on the stand so that the casing covers at least a base portion of the stand, for example, the base of the seat, the supporting element of the seat being guided through the recess of the casing.

Further advantageous embodiments of the inventive apparatus and the inventive system are explained in more detail in the following figures.

Figure 1:
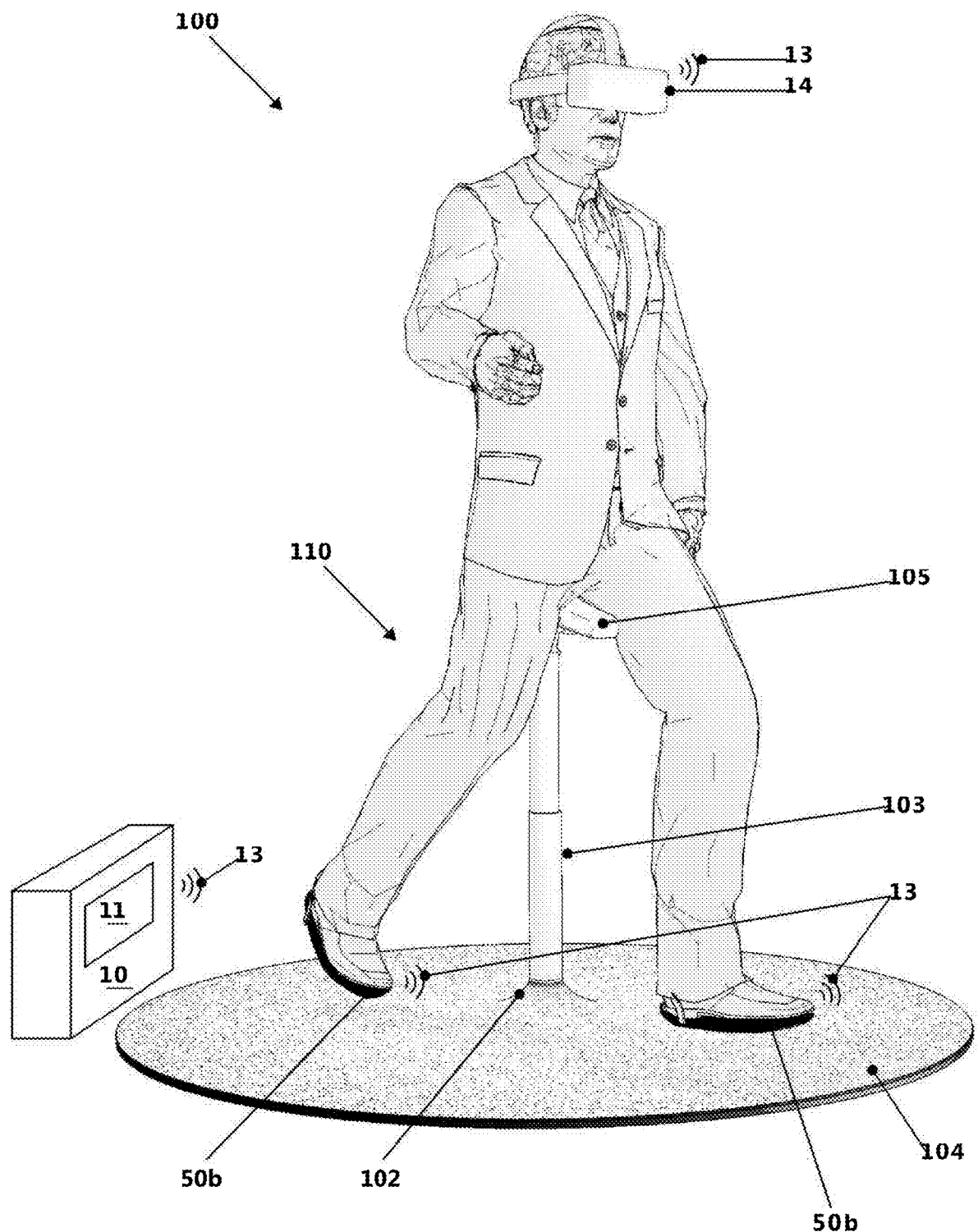
FIG. 1 shows a perspective view of a first embodiment of the inventive system in operating mode during use by a person, wherein a seat element of a seat of the system has the shape of a bicycle saddle.

FIG. 1 shows a perspective view of a first embodiment of inventive system 100 in operating mode during use by a person, wherein a seat element 105 of a seat 110 of system 100 has the shape of a bicycle saddle. System 100 also includes a tread surface 104 resting on ground, cyber foot covers implemented by sandals 50b, and central control means 10 for controlling a display means indicating a virtual space. The display means can be implemented by 3D glasses 14, at least a display or at least a beamer.

System 100 may further include a central control means 10 implemented by a computer or a game console, the central control means 10 comprising an input unit 11 as shown in FIG. 1 in simplified form. Input unit 11 can be, for example, implemented by a touch display, a mouse, at least one joystick, at least one controller and/or a keyboard. Central control means 10 is arranged at system 100 externally to a display means displaying a virtual space and to cyber foot covers. However, it is also possible that central control means 10 is arranged in at least one of the cyber foot covers and/or in the display means. The display means is preferably implemented as 3D glasses 14.

Non-shown sensors are arranged in sandals 50b, wherein signals from the sensors are transmitted to central control means 10 via a radio network 13 by means of non-shown microcontrollers arranged in sandals 50b. Central control means 10 converts the received signals into a virtual space and changes a display in 3D glasses 14 accordingly. 3D glasses 14 and central control means 10 are connected via radio network 13 for communication.

In another embodiment, seat 110 has an armrest and/or a backrest. The safety of the person using system 100 can be increased by the armrest and/or the backrest.

Figure 2A:
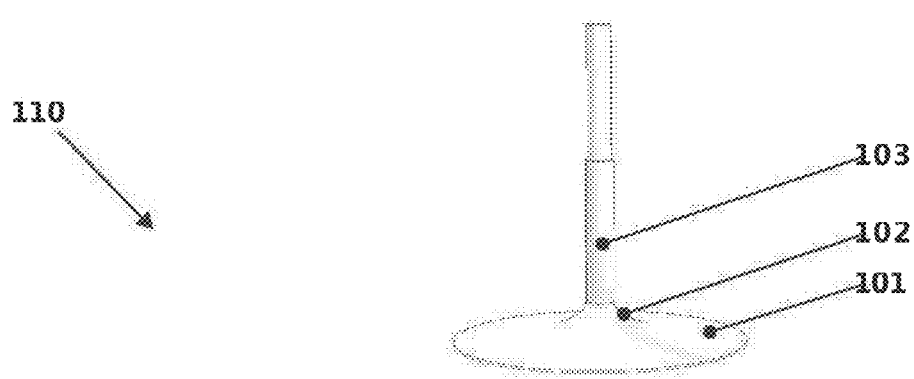
FIGS. 2a, 2b and 2c show, in perspective view, steps of assembling parts of the embodiment of the system as shown in FIG. 1.
Figure 2B:
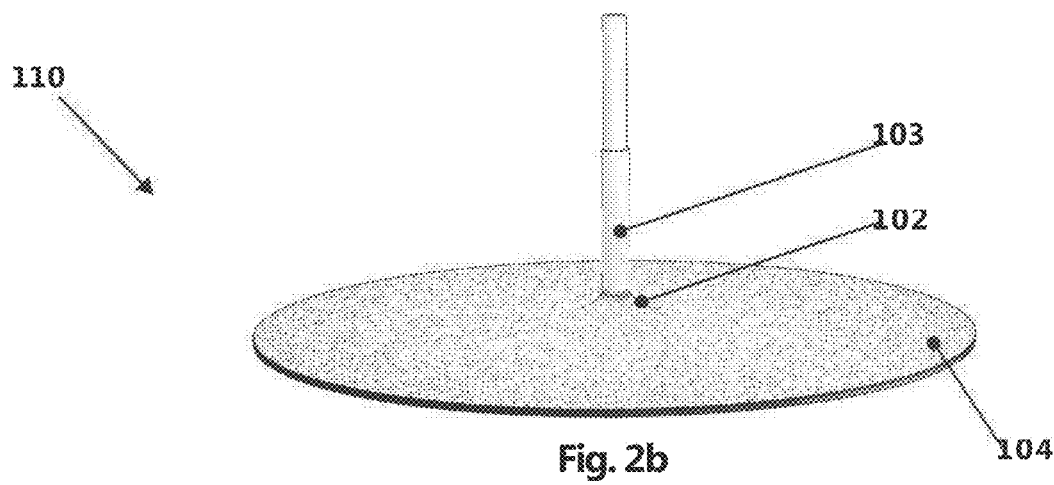
Figure 2C:
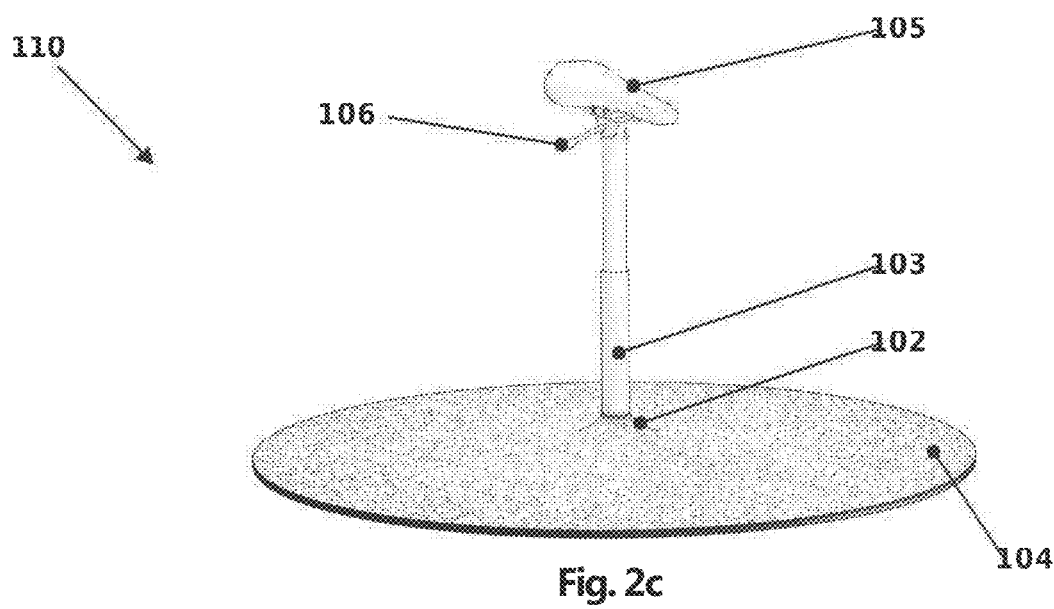

FIGS. 2a, 2b and 2c show, in perspective view, steps in assembling seat 110 of system 100 according to FIG. 1. Seat 110 includes seat element 105, support member 103 and a stand 101. Preferably, support member 103 is a gas (pressure) spring. Stand 101 has a curvature 102 and accommodates support member 103, preferably on a lower part of support member 103. Stand 101 serves to stabilize seat 110 and has an advantageous diameter so that seat 110 stands up stable without tilting on the ground. There is also the possibility that stand 101 can be screwed and/or glued to the ground and/or that stand 101 has suction cups or Velcro strips to securely connect stand 101 to the ground. An upper part of support member 103 can be connected to seat element 105 by means of a plug connection which is not shown in detail. Seat element 105 has the shape of a bicycle saddle and can be moved relative to stand 101 via support member 103 by means of a lever 106. This has the advantage that seat 110 can be adapted to a person's height. In addition, support member 103 permits rotation of seat element 105 relative to stand 101, wherein a non-shown rotation angle sensor measuring the rotation may be arranged in support member 103. The rotation angle sensor arranged in support member 103 can also be coupled to central control means 10 via radio network 13. Before seat element 105 is mounted on support member 103, tread surface 104 of system 100 as shown in FIG. 1 is put over support member 103, wherein support member 103 is passed through a hole arranged in the tread surface 104. Tread surface 104 is provided with a textile in the form of fabric or a carpet on its surface. In a further embodiment, tread surface 104 is provided with a foam material on its surface.

The use of a bicycle saddle as seat element 105 has the advantage that the person sitting on the seat element 105 has very good legroom. Seat element 105 is very narrow in this embodiment, whereby the narrower seat element 105 is, the lower the seating comfort for the person is.

In a further embodiment, support member 103 is arranged by an electrically controllable actuator.

Figure 3:
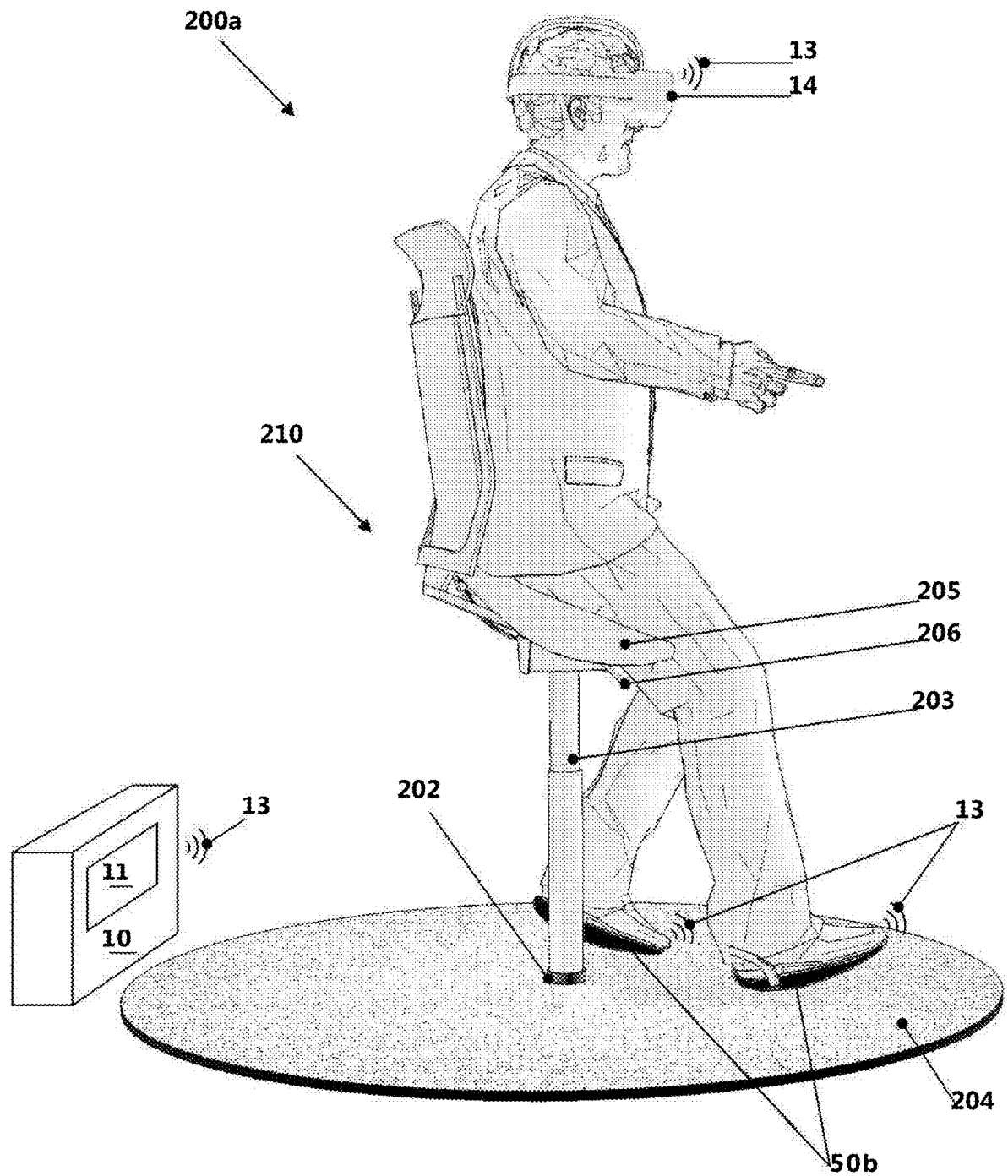
FIG. 3 shows a perspective view of a further embodiment of the inventive system in operating mode during use by a person, wherein a seat element of a seat of the system has the shape of a saddle.
Figure 8A:
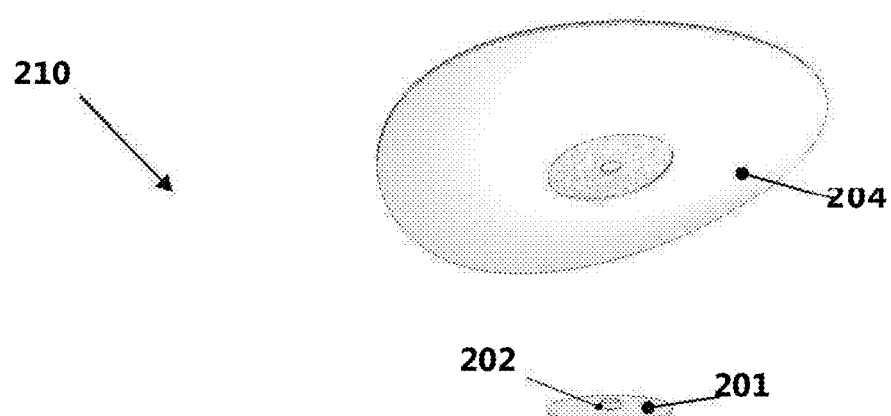
FIGS. 8a to 8c show steps in perspective when assembling parts of the embodiment of the system as shown in FIG. 3 or the system as shown in FIG. 7.

FIG. 3 shows a perspective view of another embodiment of the inventive system 200a in operating mode during use by one person. In contrast to system 100 shown in FIG. 1, system 200a has a seat 210 which has a seat element 205 implemented by a saddle with backrest. In addition, a stand 201 of seat 210 has a different shape as compared to stand 101 of seat 110 shown in FIG. 1. Stand 201 is shown in FIG. 8a. A tread surface 204 of system 200a is correspondingly adapted to a shape of stand 201. As a result of the shape of seat element 205, a sitting position of the person on seat 210 is different as compared to a sitting position of the person on seat 110 of system 100 as shown in FIG. 1, whereby the saddle shape of seat element 205 can give the person a higher feeling of safety when using system 200a.

Figure 4A:
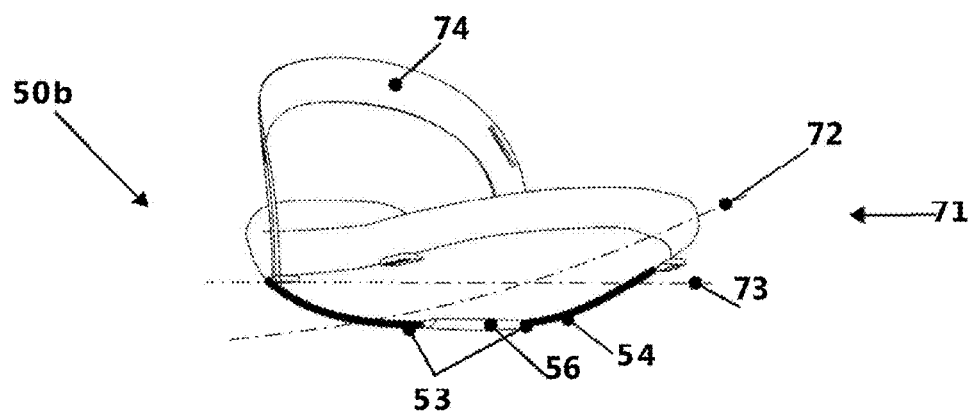
FIGS. 4a to 4c show, in different perspective views, an embodiment of cyber foot covers.
Figure 4B:
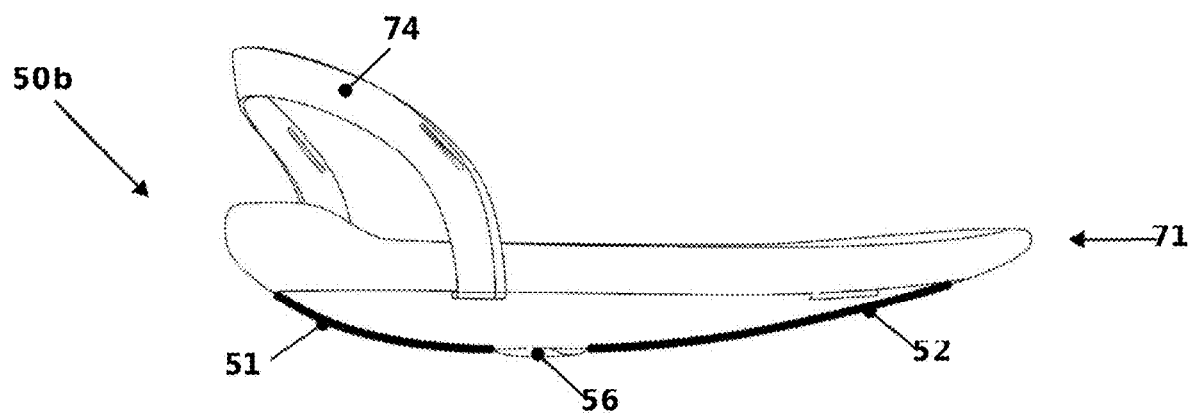
Figure 4C:
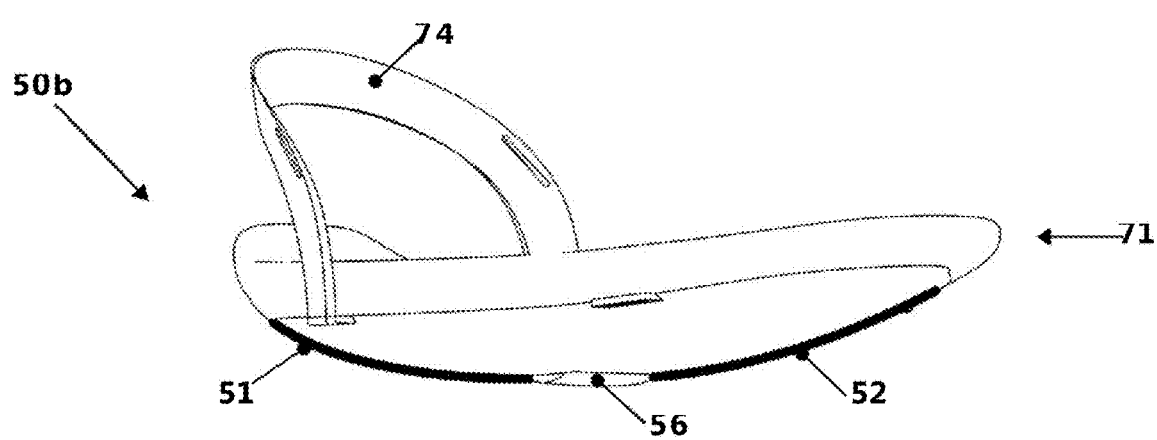

FIGS. 4a to 4c show, in a perspective view, sandals 50b of system 100 according to FIG. 1 or system 200b according to FIG. 3 in detail. Sandals 50b each comprise a non-shown acceleration sensor and a rolling element 56 having a non-shown rotation angle sensor, wherein rolling element 56 is arranged on an underside of a sole 71 of sandals 50b. The rotation angle sensor is implemented by a Hall effect sensor.

Sole 71 of sandals 50b is curved, whereby the curvature in longitudinal direction 72 is convex. In some embodiments, sole 71 is also convex in transverse direction 73. Sole 71 may have a front region 52 in longitudinal direction 72 and a rear region 51, whereby a radius of the convex curvature of sole 71 in the front region 52 of sole 71 is larger than in the rear region 51 of sole 71. This has the advantage that the person can roll the feet continuously gliding over the tread surface or a floor despite limited mobility of the legs, in particular the upper thighs, because of the seat element. Sole 71 may have lateral regions 54 in the transverse direction 73 and a central region 53 between the lateral regions. The lateral regions 54 can be stronger curved than the central region 53. Depending on the embodiment and covering of a ground or floor, it may be advantageous to at least partially provide the lateral regions 54 with a layer or elements having a higher coefficient of friction than a surface of the centrally arranged region 53. This has the advantage that the person may change direction quickly and easily, and the feet of the person can still rotate easily on the stand. In another embodiment, it may be advantageous that the lateral regions 54 have longitudinal ribs which run in longitudinal direction and protrude from the sole 71.

In one embodiment, sandals 50b each have a heel strap 74 which is fixed to sole 71. Furthermore, sandals 50b may have additional straps 76 to attach sandals 50*b* to the person's feet. The additional straps 76 are shown in FIG. 5.

Conveniently, sole 71 is 12 mm to 48 mm thick. However, it should be noted that sole 71 may also be up to 50% lower or up to 200% higher. The optimum height of sole 71 is preferably adjusted according to a shape of the seat element. A high sole 71 is particularly advantageous if the seat element is implemented as an armchair or office chair with a wide seat. See FIG. 12. Preferably, the person wearing a sandal 50*b* with a low sole does not wear extra shoes and if it does, it is advantageous if the extra shoe is as flexible as possible.

Figure 5:
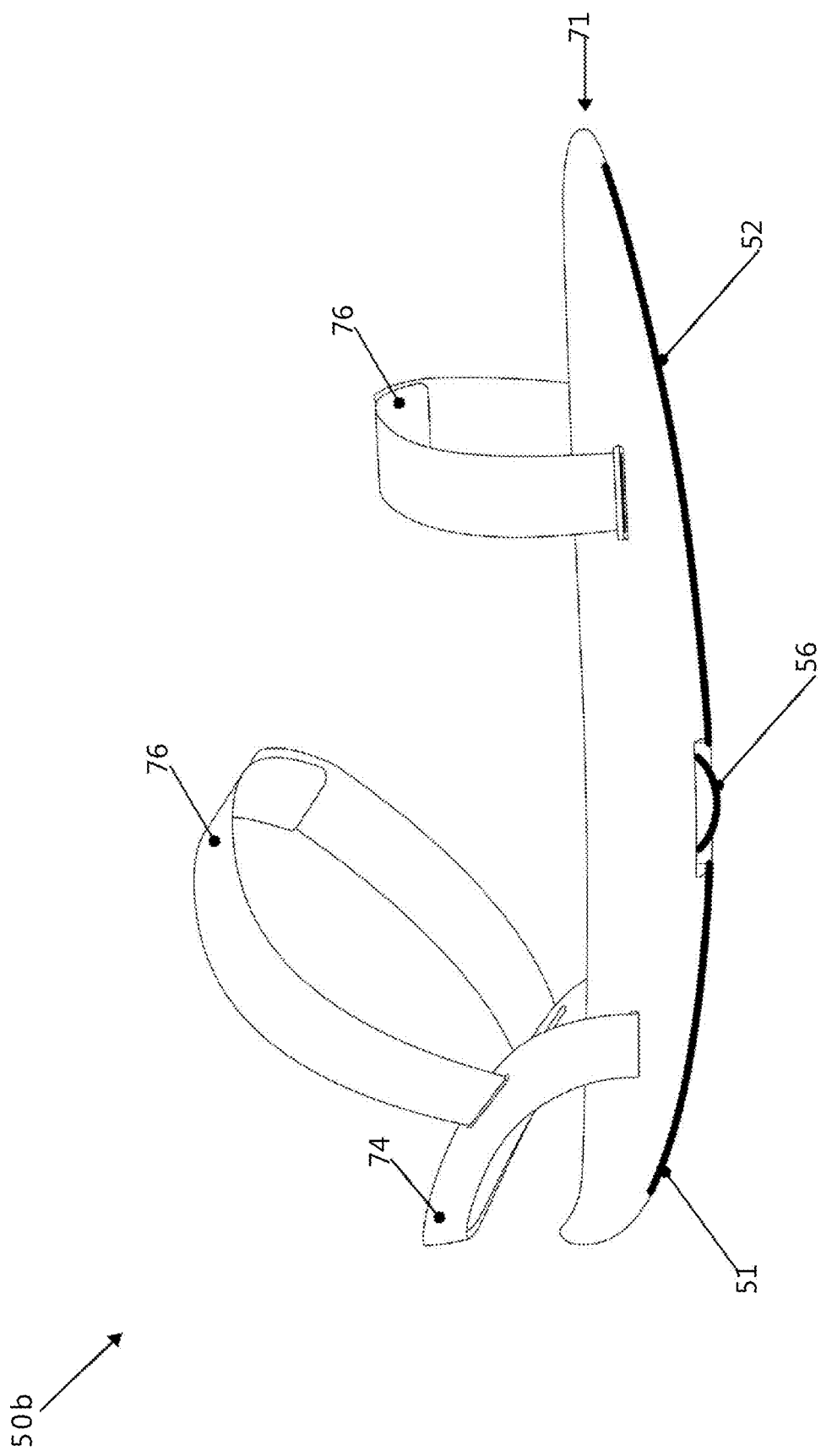
FIG. 5 shows a side view of the cyber foot cover according to FIGS. 4a to 4c.

FIG. 5 shows a side view of the cyber foot cover 50*b* according to FIGS. 4*a* to 4*c*.

Figure 6:
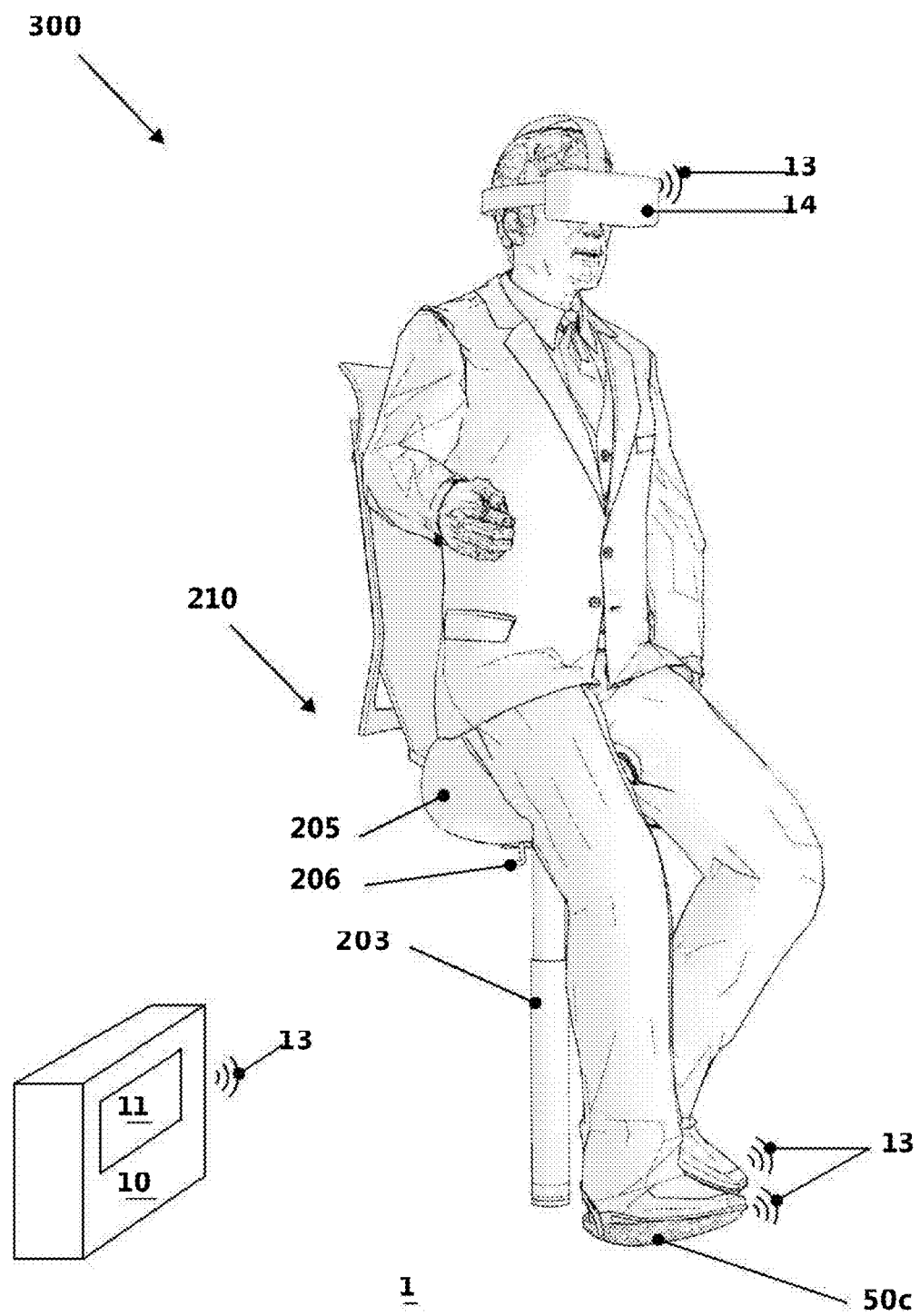
FIG. 6 shows a perspective view of a further embodiment of the inventive system in operating mode during use by a person, wherein a seat element of a seat of the system has the shape of a saddle.

FIG. 6 shows a perspective view of another embodiment of an inventive system 300 in operating mode during use by one person. Unlike system 200*a* shown in FIG. 3, system 300 has no tread surface. Sandals 50*c* differ from sandals 50*b* shown in FIGS. 4*a* to 4*c* in that one sole of sandals 50*c* is covered with a textile, especially a carpet. Support member 203, which may be implemented as a gas (pressure) spring, is anchored directly in a ground implemented by a floor, the floor having a very smooth surface with a low coefficient of friction. The floor is implemented, for example, by a parquet floor.

Figure 7:
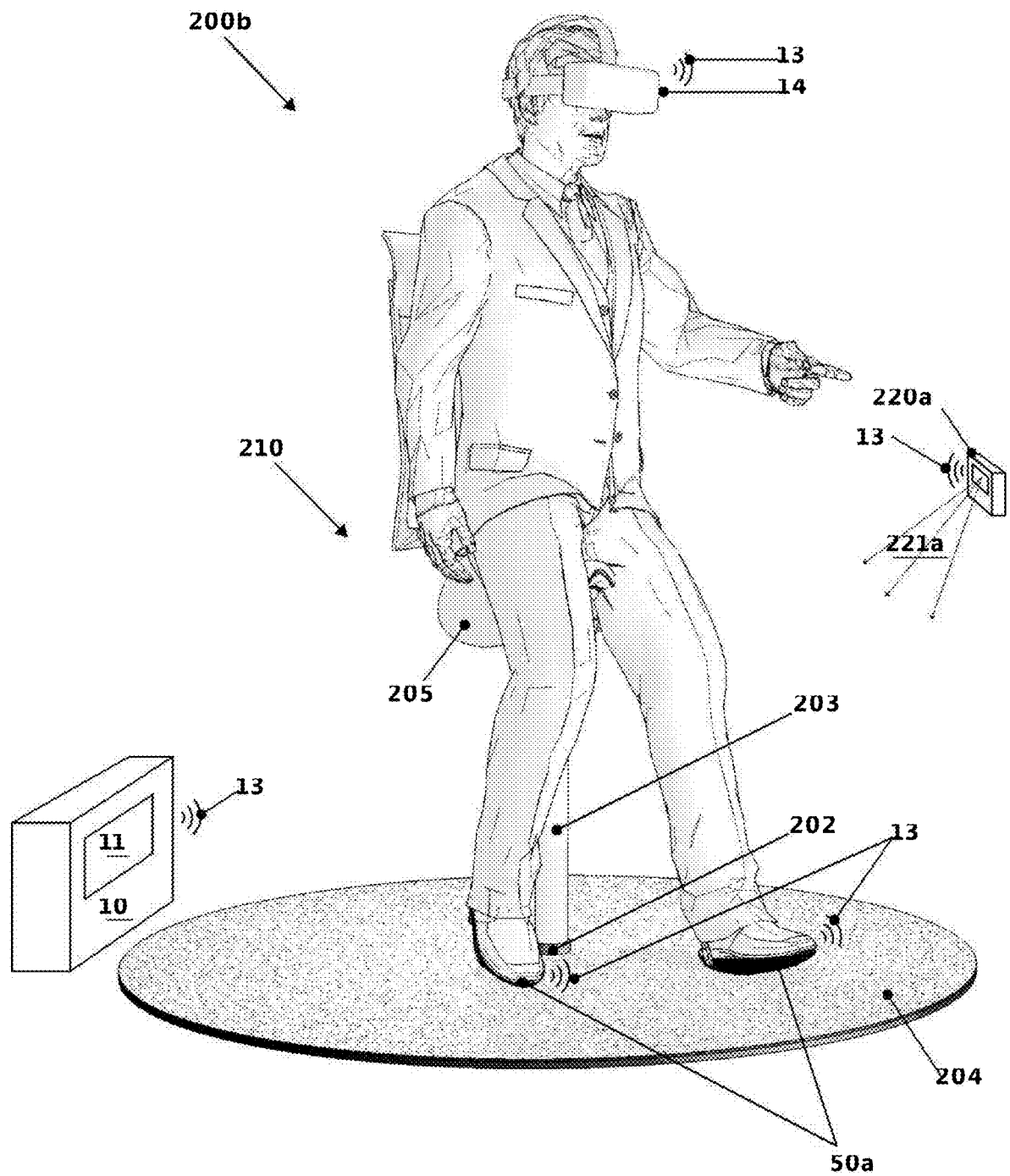
FIG. 7 shows a perspective view of a further embodiment of the inventive system in operating mode during use by a person, wherein a seat element of a seat of the system has the shape of a saddle.

FIG. 7 shows a perspective view of another embodiment of inventive system 200*b* in operating mode during use by a person. Seat 210 of system 200*b* is arranged in the same way as seat 210 of system 200*a* according to FIG. 3. System 200*b* differs mainly from system 200*a* according to FIG. 3 in the design of the sensors. The sensors of system 200*b* are implemented by optical sensors 220*a* arranged decentralized with respect to the person and by proximity sensors implemented in sandals 50*a*. Sandals 50*a* have no rolling element and are shown in detail in FIG. 9. Optical sensors 220*a* are configured to detect the movements of the person and, in particular, the movements of the person's legs by means of laser triangulation 221*a*.

Figure 8B:
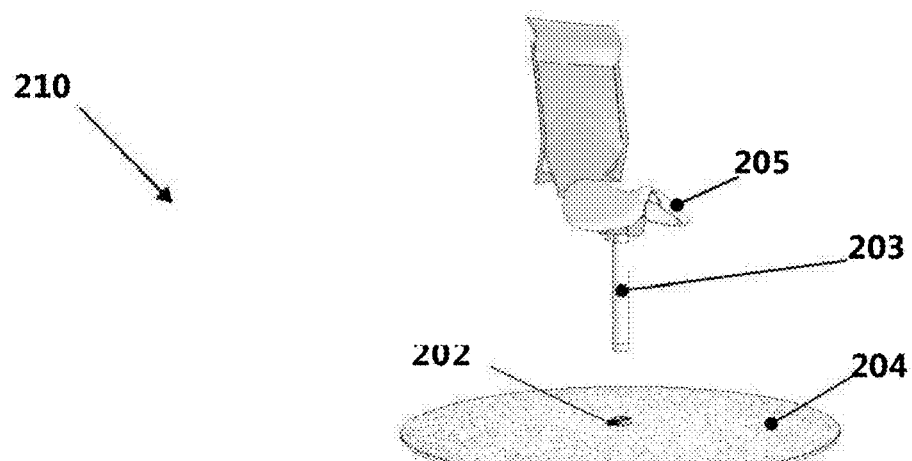
Figure 8C:
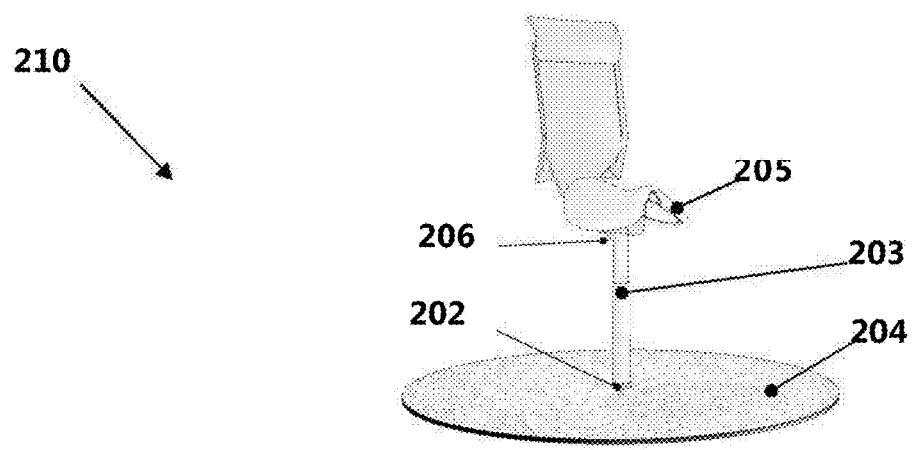

FIGS. 8*a* to 8*c* show, in perspective view, steps in assembling seat 210 of system 200*a* according to FIG. 3 and system 200*b* according to FIG. 7. Seat 210 consists of stand 201, a support member 203 which may be implemented as a gas (pressure) spring, and saddle 205. Stand 201 has a slightly conical shaped rim 202 into which support member 203 is inserted, wherein support member 203 is fixed in stand 201 by a weight of the person. In tread surface 204, a recess is provided on the underside into which the stand 201 fits. This has the advantage that tread surface 204 may lie flat on a floor and no edges are formed that would interfere with the walking movement. A lever 206 may be attached to saddle 205, by means of which seat element 205 may be adjusted in height via support member 203. Tread surface 204 is also advantageously provided with a carpet on its surface.

Figure 9:
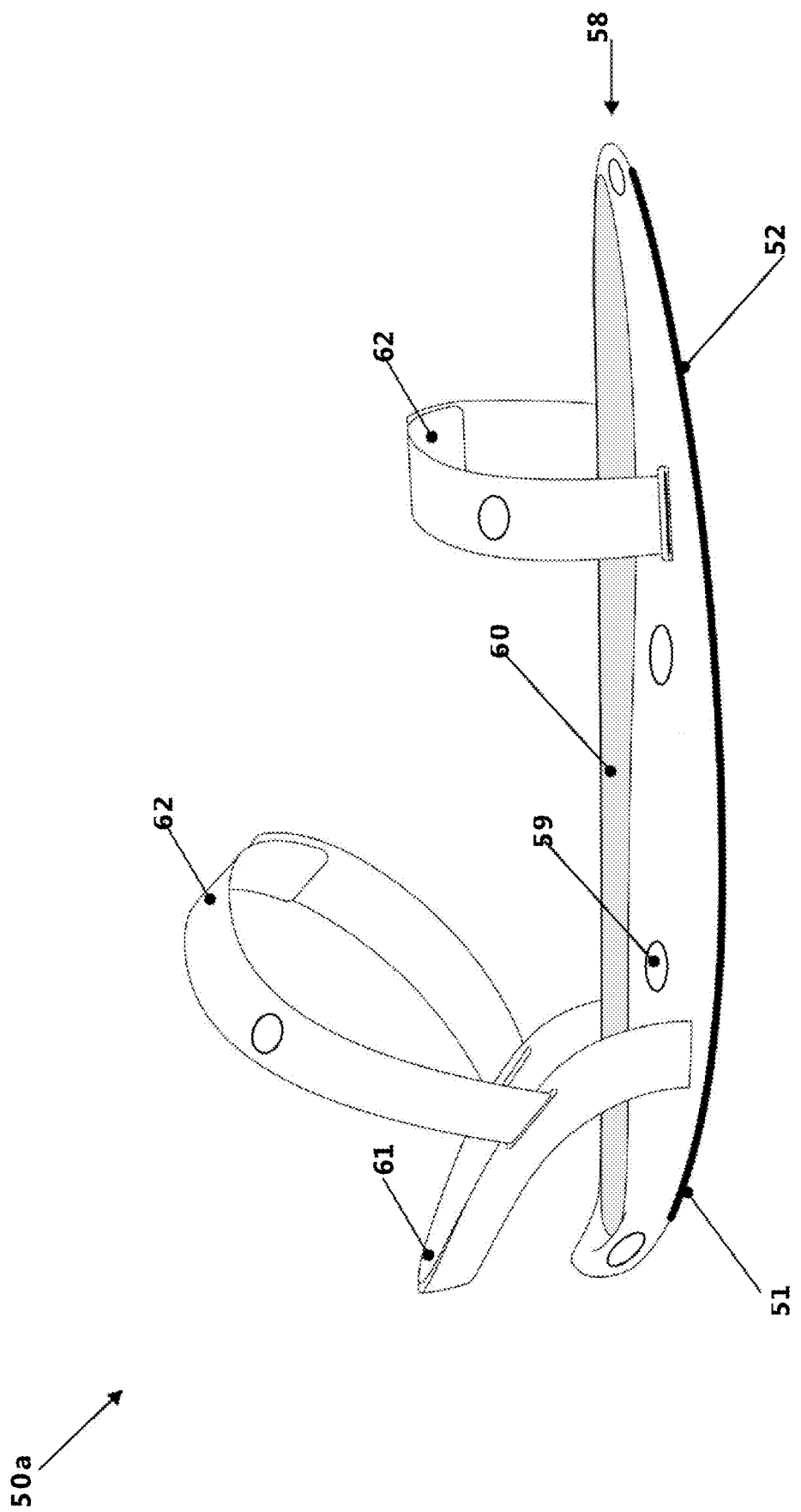
FIG. 9 shows a perspective view of another embodiment of a cyber foot cover.

FIG. 9 shows a side view of sandals 50*a* of system 200*b* after FIG. 7 in detail. Sandals 50*a* feature a heel strap 61 made of aluminum or plastic and two additional straps 62. The additional straps 62 are flexible and adjustable in length. In addition, sandals 50*a* comprise passive motion capture marker 59, distributed along sandals 50*a*, feature a non-shown microcontroller and non-shown proximity sensors. The proximity sensors detect a distance between sandals 50*a* and tread surface 204, whereby signals from the proximity sensors are transmitted via the microcontroller to central control means 10. Thanks to motion capture marker 59, system 200*b* has a very high accuracy. A sole 58 of sandal 50*a* is curved according to sole 71 of sandal 50*b* shown in FIGS. 4*a* to 4*b*. Accordingly, sandals 50*a*, as shown in sandals 50*b* in FIGS. 4*a* to 4*c*, have a front region 21 and a rear region 51 in the longitudinal direction, whereby a radius of a sole 58 of sandals 50*a* is larger in the front region 52 than in the rear region 51.

Sole 58 has a very low coefficient of friction on its underside, which means that no rolling element is required for this embodiment of the cyber foot cover. Depending on the application, however, it may still be advantageous to partially coat sole 58 of sandals 50*a* with elements or a coating that increases the coefficient of friction. An upper side of sole 58 is provided with a layer 60, which has a very high coefficient of friction. Layer 60, for example, is implemented by rubber. This has the advantage that sandal 50*a* is better fixed to one foot of the person.

In another embodiment, sandals 50*a* feature active motion capture markers, which are controlled by the microcontroller in sandals 50*a*. In sandals 50*a* with active motion capture markers, optical sensors 220*a* are advantageously not implemented by sensors, but by laser light units. The laser light units are configured to output various static and/or dynamic light pulses.

In a further embodiment, further motion capture markers are attached to the person's clothing.

Figure 10A:
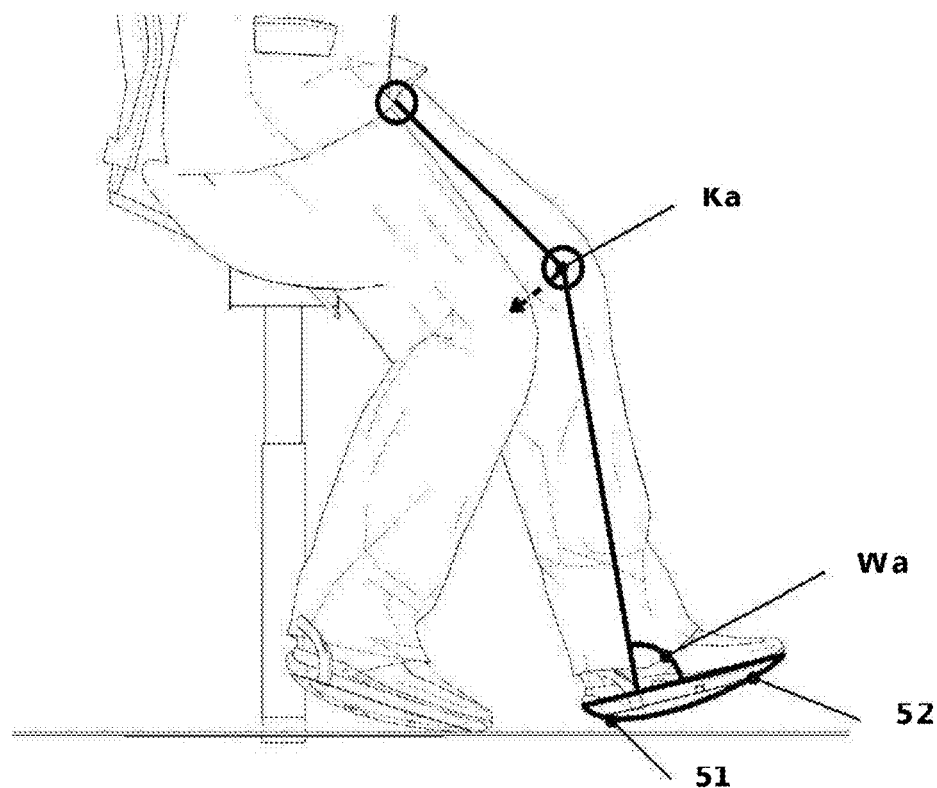
FIGS. 10a and 10b show, in a lateral perspective, the principle of a walking movement on a seat of the system according to FIG. 3, FIG. 6, or FIG. 7.
Figure 10B:
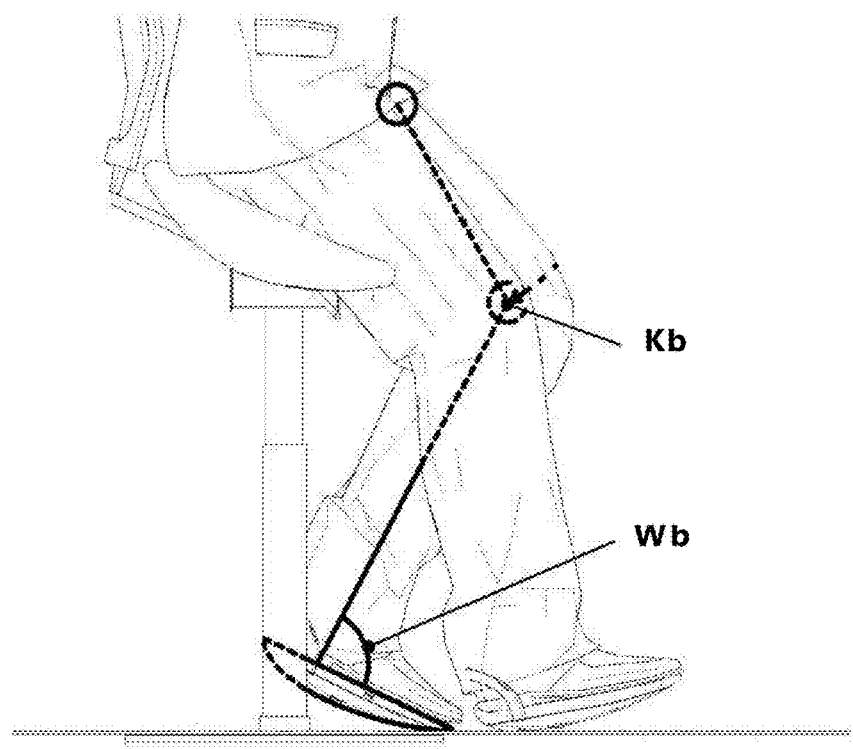

FIGS. 10*a* and 10*b* show, from a lateral perspective, the principle of a walking movement utilizing seat element 205 of system 200*a* as shown in FIG. 3, system 300 as shown in FIG. 6 or system 200*b* as shown in FIG. 7. During a walking movement utilizing seat element 205, the person moves the knee joint from a position Ka to a position Kb, indicated here by the left foot. At the same time as this movement, the person rolls his left foot over the ground, tightening the ankle joint, see difference between angle Wa and Wb.

Figure 11:
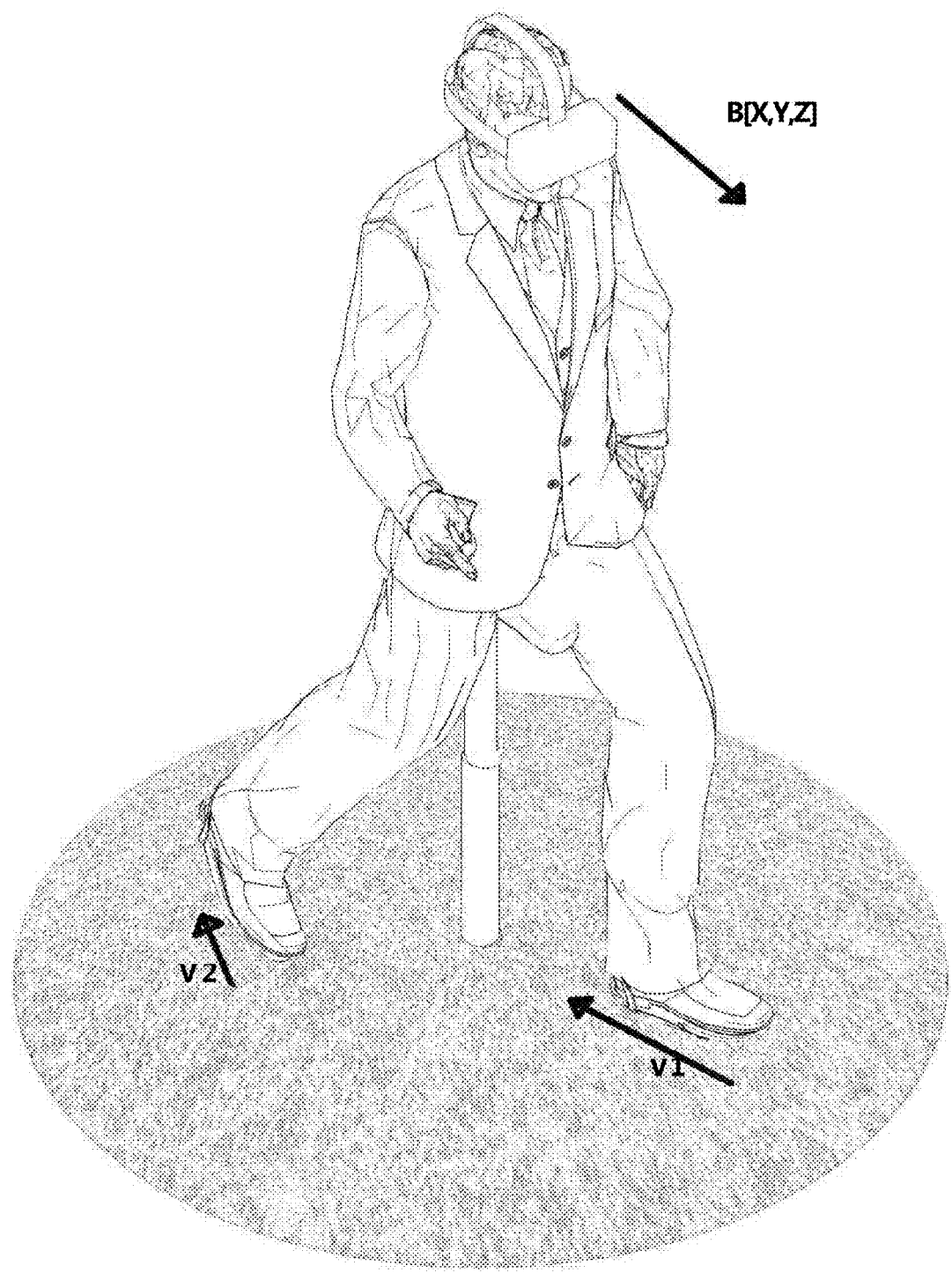
FIG. 11 shows a general embodiment of the inventive system and a person using the system.

FIG. 11 shows a general embodiment of the inventive system and a person using the system.

Figure 12:
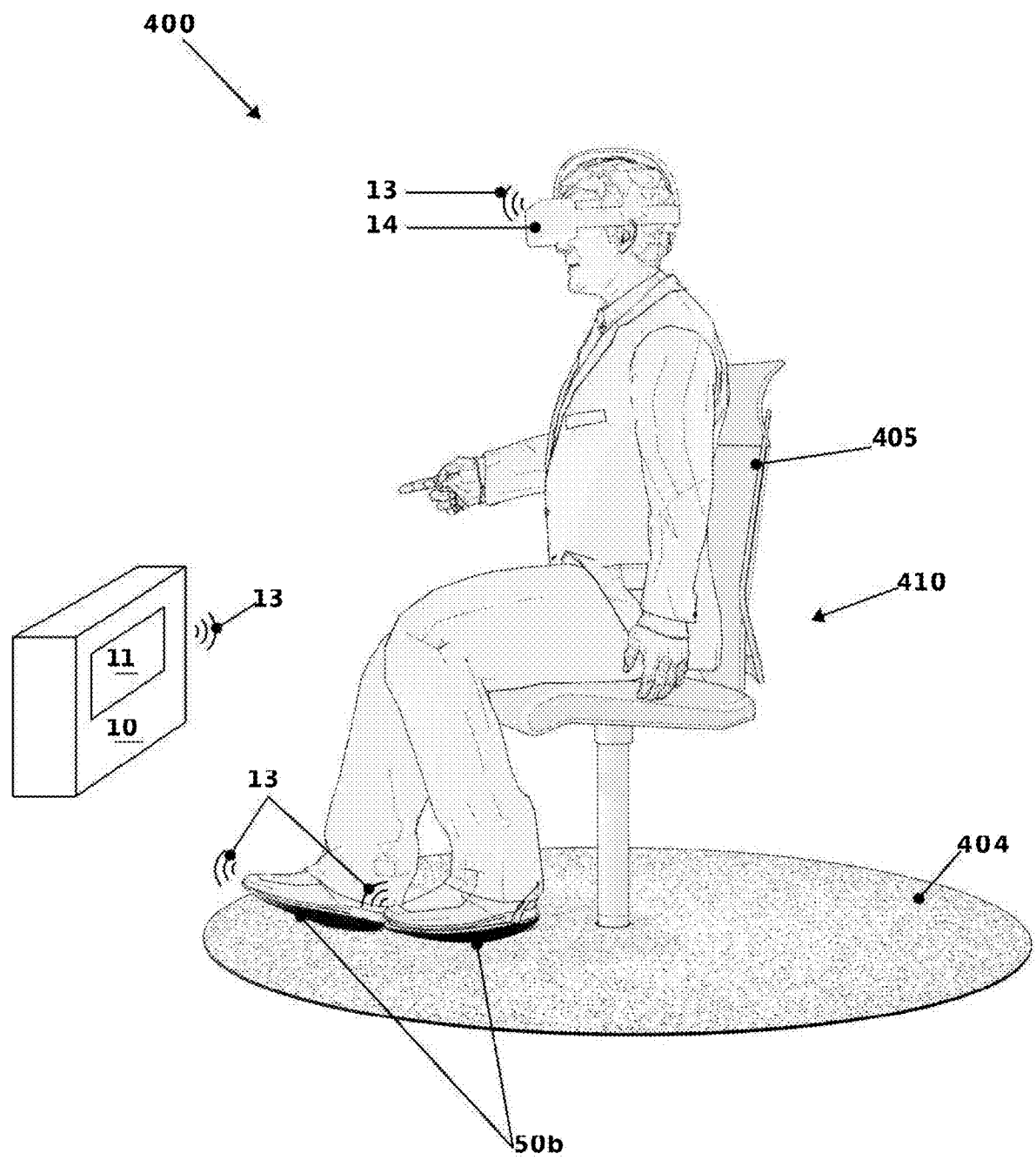
FIG. 12 shows a perspective view of a further embodiment of the inventive system in operating mode during use by a person, wherein a seat element of a seat of the system has the shape of an office seat.

FIG. 12 shows a perspective view of a further embodiment of inventive system 400 in operating mode during use by a person, wherein system 400 differs from system 100 according to FIG. 1 only with regard to seat element 405. Seat element 405 has the shape of an office seat and has a flat seat surface. System 400 also has a tread surface 404.

FIG. 11 shows how a movement of a person using the system is transferred to an avatar moving in a virtual space.

Depending on the embodiment, the speed of the person's feet is recorded differently. In systems 100, 200*a*, 300 and 400, the speed of the feet is determined by means of the rolling elements and Hall effect sensors installed in the cyber foot covers.

In system 200*b*, the speed of the feet is measured using sensor 220*a*. The additional proximity sensors installed in sandals 50*a* determine whether the person has made contact with tread surface 204 by means of sandals 50*a* or not. The information is continuously transmitted via radio network 13 to central control means 10. In central control means 10, the information is processed in such a way that in the case of a non-ground contact, the speed of the respective sandal 50*a* is set to zero and in the case of a ground contact, the speed is set according to a value currently detected by the 220*a* sensors. As shown in FIG. 11 using arrows V1 and V2, both the left sandal 50*a* and the right sandal 50*a* have ground contact at the shown moment. At this moment, the speed of the left sandal 50*a* is higher than the speed of the right sandal 50*a*.

Depending on the embodiment, a direction vector R[X, Y, 0] of an intended direction of movement of the person may be detected by means of 3D glasses 14, by means of the rotation angle sensor in the gas spring 103 and/or by means of an alignment of the cyber foot covers.

When determining the direction vector R[X, Y, 0] by means of 3D glasses 14, a viewing direction B[X,Y,Z] of the person is permanently recorded by 3D glasses 14. 3D glasses 14 is preferably implemented by standard 3D glasses 14. Viewing direction B[X,Y,Z] is continuously transmitted to central control means 10. In central control means 10, the Z component of the viewing direction B[X,Y,Z] is set to zero and the components X and Y of the direction vector R[X, Y,0] are calculated using an algorithm. This is the simplest way to determine a person's intended direction of movement.

When determining the direction vector R[X, Y, 0] by means of the rotation angle sensor, the direction vector R[X,Y,0] is determined via the alignment of the seat element relative to the ground or to the tread surface. The alignment of saddle 205 corresponds to the alignment of the person's pelvis. By determining the direction vector R[X,Y,0] via the orientation of the seat element, an advantage is obtained that an even more real movement in the virtual world is simulated for the person.

When determining the direction vector R[X, Y, 0] via the alignment of the cyber foot covers, both the current position of the cyber foot covers and the current alignment of the cyber foot covers are continuously detected by central control means 10.

In a further embodiment, the acceleration of the cyber foot covers is also continuously recorded by acceleration sensors.

Using the determined data of V1, V2 and R[X,Y,0], a movement of the avatar is performed during each calculation pass through the central control means 10 as follows:

From speed V1 and V2 a speed of the person is calculated according to the following formula:

$$V=\text{MAXIMUM VALUE}(|V1|,|V2|)*\text{SIGN}(V1+V2)*(-1);$$

A distance D to be covered is calculated from V by multiplying V by a time interval between two calculation passes. Furthermore, the distance D to be covered may be multiplied by a correction factor k (e.g. for a necessary conversion from centimeters to meters). Formula:

$$D=V*(\text{time difference between calculation passes})*k;$$

From the distance D and the direction vector R[X,Y,0], a translation vector T[X,Y,0] is calculated by calculating an amount of the direction vector R[X,Y,0] for the length of the distance D. The translation vector T[X, Y,0] is calculated from the distance D and the direction vector R[X,Y,0]. I.e. a negative distance D causes a reversal of the direction obtained from the direction vector R[X,Y,0], a positive distance D causes this direction to be maintained. Preferably, the speed of the person is converted to the distance covered by a graphics software of central control means 10. In this respect, it is advantageous that a directed average speed is transferred to the graphics software instead of the translation vector T[X,Y,0].

For each calculation pass, the avatar is moved by the translation vector T[X,Y,0] or according to the directional average speed.

In addition, the movement of the avatar may be smoothed with already known algorithms. In addition, there is the possibility that the avatar is limited and/or guided in its movements by means of standard software calculation. This may be used to simulate gravity or collisions. The viewing direction of the avatar is controlled according to the usual methodology according to the viewing direction captured by 3D glasses 14.

Figure 13:
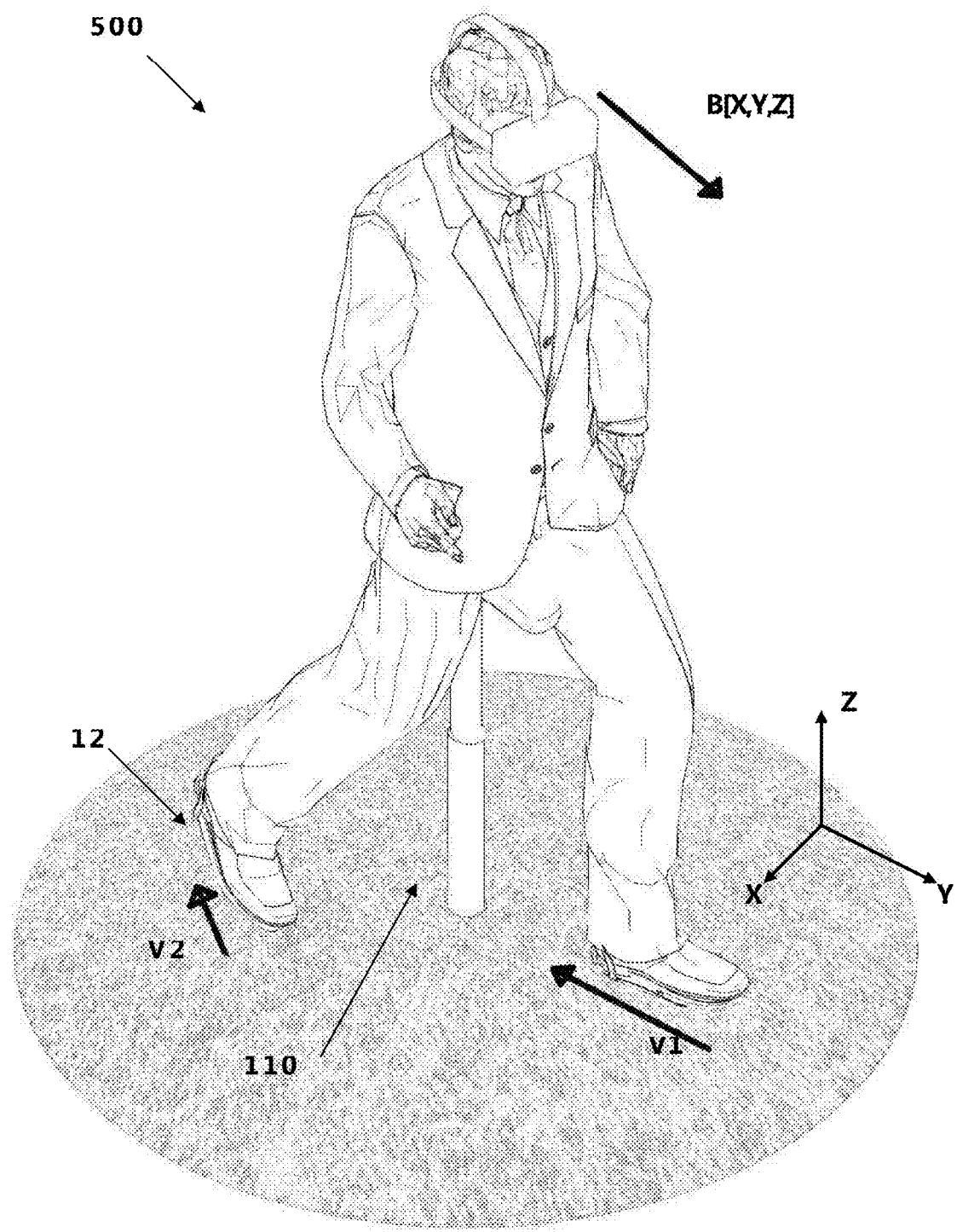
FIG. 13 shows another general embodiment of the inventive system and a person using the system.

FIG. 13 shows another general embodiment of inventive system 500 and a person using the system 500. System 500 features cyber foot covers and is equipped with a seat 110 as shown in FIGS. 2a-2c. The system may also have a central control means 12 and a virtual display means, for example, in the form of 3D glasses. The seat may also be implemented in accordance with a seat of another embodiment described herein or be implemented by a combination of elements of the seats described herein. Central control means 12 is arranged in the right cyber foot cover, but may also be arranged in the left cyber foot cover, in the virtual display means, or in a proprietary housing.

FIG. 13 shows how a person using the system causes the avatar to move laterally, forward/backward and/or rotate and/or curve in virtual space. In this context, the movements of the feet of the person and the speeds of the feet of the person, respectively, are broken down at least into X and Y coordinates, advantageously into X, Y and Z coordination, and/or respective rotations about these axes, wherein a forward/backward movement of the feet substantially corresponds to the Y components, a lateral movement substantially corresponds to the X component and a movement along the vertical substantially corresponds to a Z movement. The coordinate system shown in FIG. 13 is a fixed-foot coordinate system, whereby for simplicity's sake only one of fixed-foot coordinate systems is shown in FIG. 13.

The X component and Y component of the movement of the person's feet are recorded advantageously as follows:
  by means of at least one rolling element arranged in a sole of the cyber foot cover, wherein a rotation of the at least one rolling element is detected by at least one rotation angle sensor. The rotation angle sensor may be implemented by an optical sensor, such as a laser, or a magnetic sensor, such as a Hall effect sensor. Preferably, at least one rolling element is implemented by a sphere or by an all-side roller. It is advantageous to additionally attach a load sensor to at least one rolling element, which detects a load applied to at least one rolling element;
  by means of at least one optical sensor arranged decentralized with respect to the person and corresponding to system 200b in accordance with FIG. 7, which detects at least the movements of the feet. With at least one decentralized arranged optical sensor, a Z component of the movement of the person's feet may also be detected;
  by means of at least two position sensors, one position sensor in each case being arranged in a cyber foot cover. The position sensors determine their position advantageously by means of reference points arranged around the system;
  and/or
  by means of at least two optical sensors, wherein one optical sensor is arranged in each cyber foot cover. The optical sensors, for example, may be optical sensors which are also used in computer mice.

Based on the detected X and Y components of the person's feet movements, the central control means determines whether the person wants to move laterally, forward/backward, rotate or to walk along a curve. In this respect, at least one proximity sensor and/or at least one pressure sensor per cyber foot cover is advantageously arranged in the cyber foot covers. Expediently, the at least one proximity sensor and/or at least one pressure sensor is arranged in longitudinal direction of the cyber foot covers in the front region of the sole of the cyber foot covers. Specifically, the at least one proximity sensor and/or pressure sensor is arranged in a region of the cyber foot cover which, when the person wears the cyber foot cover, is located in the area of the ball of the person's foot.

In order to improve the distinction of the central control means between lateral movements, forward/backward movements, rotary movements or curved walk movements, it is also possible to detect rotary movements of the feet around the Z-axis. This may be done, for example, by optical sensors arranged externally to the cyber foot covers and/or two optical sensors and/or rolling elements and/or position sensors arranged on a cyber foot cover. By means of external optical sensors arranged to the cyber foot covers, it is also possible to detect the rotation of the person's feet around the X-axis and Y-axis.

The conversion of the movements of the feet of the person using the system to the movements of the virtual avatar in virtual space is carried out by central control means 12 according to at least one of the following criteria:

- Size of the X component of the movement of the person's feet in relation to the Y component of the movement of the feet. If the Y component of the movement of the person's feet is approximately zero and an X component is present, the virtual avatar is moved laterally. If the X component of the movement of the person's feet is nearly zero and a Y component is present, the virtual avatar is moved forward/backward.
- Rotation of the feet around the Z axis. A rotation of the feet about the Z-axis during a walking movement is a strong indicator that the person wants to cause the virtual avatar to perform a curved walk movement.
- Size of the X component of the movement of the person's feet in relation to a rotational movement of the person sitting at the seat. If an X component is present and the person is essentially seated at the seat and does not rotate relative to the ground, i.e. a rotation of the person's pelvis is approximately zero, the virtual avatar is moved laterally. If an X component is present and the person is seated at the seat and performs a significant rotational movement relative to the ground, i.e. a significant rotation of the person's pelvis is detected, the virtual avatar is caused to rotate about its own axis. The rotation of the center of the body is advantageously determined by the at least one decentralized arranged optical sensor and/or by a rotation of the seat element 105 relative to a ground by a rotation angle sensor on seat 110. The rotation angle sensor is advantageously attached to support member 103.
- Pressure force on the sole of the cyber foot cover. A pressure force on the sole in the front region of the cyber foot covers in the area of the person's ball of foot and a rotation of the person's body center about his own axis is a strong indicator that the person wants to cause the virtual avatar to make a rotation.
- If rolling elements are present in the cyber foot covers, the rolling elements are loaded. In the event of a high load on the rolling elements and the presence of an X component of foot movement, the virtual avatar is caused to rotate. With a low load, i.e. a load of approximately zero on the rolling elements and the presence of an X component of the foot movement, the virtual avatar is caused to move laterally.
- Distance of particular regions of the sole of the cyber foot covers to the base. If there is a distance between the front region of the cyber foot covers in the area of the person's ball of foot and the base, and if there is an X component of the movement of the person's feet, the virtual avatar is moved laterally. If a distance between the front region of the cyber foot covers in the area of the person's ball of foot and the base is zero and an X component of the movement of the person's feet is present, the virtual avatar is caused to rotate.
- Position of the legs. If the person's legs are essentially angled rectangular and an X component is present, the virtual avatar moves laterally. If the person's legs are essentially stretched and an X component is present, the virtual avatar is caused to rotate. The position of the legs is determined advantageously by at least one externally arranged optical sensor and/or the position sensors.

Figure 14:
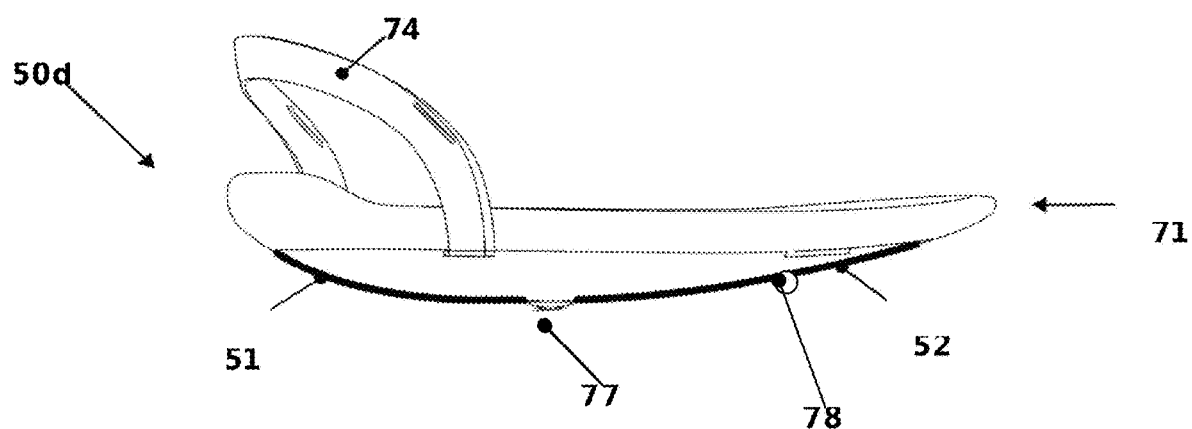
FIG. 14 shows a perspective view of another embodiment of the cyber foot cover.

A cyber foot cover with a rolling element in the form of a sphere 77 and a proximity sensor 78, for example, is implemented in the form of a sandal 50*d* in FIG. 14. Sandal 50*d* is otherwise substantially the same in construction as sandal 50*b* in FIG. 4*b*, with parts which are the same in sandal 50*d* as the parts of the sandal 50*b* in FIG. 4*b* having the same reference signs.

It should also be noted that elements and embodiments of cyber foot covers, seats, sensors, etc. of one embodiment may also be combined with other embodiments as desired. Any type of seat, cyber foot cover or sensor may be used in all apparatuses according to the invention instead of the described embodiment.

In addition, it should also be noted here that the fixed-foot coordinate system described for inventive system 500 according to FIG. 13 also applies to all other embodiments described herein. It should also be mentioned in this context that the description of system 500 according to FIG. 13 also applies to all other embodiments described here, whereby the cyber foot covers of systems 100, 200*a*, 300 and 400 are implemented with a rolling element corresponding to cyber foot covers 50*d* according to FIG. 14, an optical sensor, and/or a position sensor.

Preferred embodiments of the invention are specified in the following enumerated example embodiments (EEE):

EEE 101. A system (100; 200*a*; 200*b*; 300; 400) for detecting movements of a person using the system (100; 200*a*; 200*b*; 300; 400) and transforming the movements into a virtual space, comprising a seat (110; 210; 410) on which the person using the system (100; 200*a*; 200*b*; 300; 400) sits and which is rotatably arranged relative to a ground and shaped such that at least a movement of the legs from the knee to the distal end of the legs of the person using the system (100; 200*a*; 200*b*; 300; 400) is enabled, sensors which detect the movements of the person, a display means (14) displaying a virtual space, and a central control means (10) connected to the sensors and the display means (14) for communicating and changing the virtual space displayed by the display means (14) depending on the signals of the sensors, characterized in that the system (100; 200*a*; 200*b*; 300; 400) comprises cyber foot covers (50*a*; 50*b*; 50*c*) having a sole (58; 71) and fastening means (61; 62; 74; 76) with which the cyber foot covers (50*a*; 50*b*; 50*c*) are attachable to the legs of the person using the system (100; 200*a*; 200*b*; 300; 400), the central control means (10) is configured to convert the movement of the legs detected by the sensors into a synchronous, direction-identical and speed-identical locomotion of a virtual avatar in virtual space, and the sole (58; 71) of the cyber foot covers (50*a*; 50*b*; 50*c*; 50*d*) is curved so as to allow a continuously sliding rolling movement of the feet of the person using the system (100; 200*a*; 200*b*; 300; 400, 500) during movement of the legs of the person using the system (100; 200*a*; 200*b*; 300; 400; 500).

EEE 102. The system (100; 200*a*; 300; 400) according to EEE 101 characterized in that at least one rolling element (56) is arranged in the sole of the cyber foot cover (50*b*; 50*c*).

EEE 103. The system (100; 200*a*; 300; 400) according to EEE 102 characterized in that the sensors comprise at least one rotation angle sensor, in particular a Hall effect sensor, which detects a movement of the at least one rolling element.

EEE 104. The system (100; 200*a*; 200*b*; 300; 400) according to any one of EEE 101-103 characterized in that the curvature of the sole (58; 71) of the cyber foot covers (50*a*; 50*b*; 50*c*) is convex in a longitudinal direction of the sole (58; 71).

EEE 105. The system (100; 200*a*; 200*b*; 300; 400) according to EEE 104 characterized in that the sole (58; 71) of the cyber foot cover (50*a*; 50*b*; 50*c*) has a front region (52) and a rear region (51) in the longitudinal direction, wherein a radius of the convex curvature of the sole (58; 71) is larger in the front region (52) of the sole (58; 71) than in the rear region (51) of the sole (58; 71).

EEE 106. The system (100; 200*a*; 200*b*; 300; 400) according to any one of EEE 101-105 characterized in that the curvature of the sole (58; 71) is convex in a transverse direction, and wherein the sole (58; 71) has lateral regions (54) in the transverse direction and a region (53) arranged centrally between the lateral regions (54), wherein the lateral regions (54) of the sole (58; 71) are arranged such that they have a higher coefficient of friction than the centrally arranged region (53).

EEE 107. The system (100; 200*a*; 200*b*; 300; 400) according to any one of EEE 101-106 characterized in that the sensors comprise proximity sensors, acceleration sensors, magnetic sensors, and/or optical sensors, wherein the sensors are arranged in the cyber foot covers (50*a*; 50*b*; 50*c*).

EEE 108. The system (200*b*) according to any one of EEE 101-107 characterized in that the sensors comprise at least one optical sensor (220*a*), in particular an infrared-based optical sensor, which is arranged decentralized in an operating mode with respect to the person using the system (200*b*), wherein the at least one optical sensor (220*a*) detects the movement of the person using the system (200*b*).

EEE 109. The system (200*b*) according to EEE 108 characterized in that active and/or passive motion capture markers (59) are attached to clothing of the person using the system (200*b*) and/or to the cyber foot covers (50*a*).

EEE 110. The system (200*a*; 200*b*; 300; 400) according to any one of EEE 101-109 characterized in that the seat (210; 410) has a backrest and/or armrests.

EEE 111. The system (100; 200*a*; 200*b*; 300) according to any one of EEE 101-110 characterized in that the seat (110; 210) comprises a seat element (105; 205) substantially having the shape of a bicycle seat or a saddle.

EEE 112. The system (100; 200*a*; 200*b*; 300; 400) according to any one of EEE 101-111 characterized in that at least one of the cyber foot covers (50*a*; 50*b*; 50*c*) and the ground is provided with a textile, wherein the other of the cyber foot covers (50*a*; 50*b*; 50*c*) and the ground (104; 204; 404) has a surface with a low coefficient of friction.

EEE 113. The system (100; 200*a*; 200*b*; 400) according to any one of EEE 101-112 characterized in that the system (100; 200*a*; 200*b*; 400) has a tread surface (104; 204; 404) which is arranged around the seat (110; 210; 410) and rests on the ground.

EEE 114. A method for converting a movement of a person using the system (100; 200*a*; 200*b*; 300; 400) according to any one of EEE 101-103 to an avatar moving in a virtual space, comprising the steps of:
  detecting, with the sensors, a speed of the legs, in particular the feet, of the person using the system (100; 200*a*; 200*b*; 300; 400);
  detecting a direction vector of an intended direction of movement of the person using the system (100; 200*a*; 200*b*; 300; 400) by means of the sensors;
  determining a distance covered in a time interval in the direction of movement; and
  moving a virtual avatar according to the direction vector and the determined distance.

EEE 201. A system (100; 200*a*; 200*b*; 300; 400; 500) for detecting movements of a person using the system (100; 200*a*; 200*b*; 300; 400; 500) and for transforming the movements into a virtual space, comprising
a seat (110; 210; 410) on which the person using the system (100; 200*a*; 200*b*; 300; 400; 500) sits and which is rotatably arranged relative to a ground and shaped such that at least a movement of the legs from the knee to the distal end of the legs of the person using the system (100; 200*a*; 200*b*; 300; 400; 500) is supported,
sensors which detect the movements of the person,
a display means (14) displaying a virtual space, and
a central control means (10, 12) connected to the sensors and the display means (14) for communicating and changing the virtual space displayed by the display means (14) depending on the signals of the sensors,
characterized in that
the system (100; 200*a*; 200*b*; 300; 400; 500) comprises cyber foot covers (50*a*; 50*b*; 50*c*; 50*d*) having a sole (58; 71) and fastening means (61; 62; 74; 76) with which the cyber foot covers (50*a*; 50*b*; 50*c*) are attachable to the legs of the person using the system (100; 200*a*; 200*b*; 300; 400; 500),
the central control means (10, 12) is configured to break down the movement of the feet of the person using the system (100; 200*a*; 200*b*; 300; 400; 500), as detected by the sensors, into at least an X component and a Y component and to convert them into a synchronous, direction-identical and speed-identical locomotion of a virtual avatar in virtual space, wherein an X component substantially corresponds to a lateral movement of the feet and wherein a Y component substantially corresponds to a forward/backward movement, and
the sole (58; 71) of the cyber foot covers (50*a*; 50*b*; 50*c*; 50*d*) is curved so as to allow a continuously sliding rolling movement of the feet of the person using the system (100; 200*a*; 200*b*; 300; 400, 500) during movement of the legs of the person using the system (100; 200*a*; 200*b*; 300; 400; 500).

EEE 202. The system (500) according to EEE 201 characterized in that at least one rolling element is arranged in the sole of each cyber foot cover (50*d*), wherein the at least one rolling element is implemented by a sphere (77) or an all-side roller and wherein the sensors per rolling element comprise at least one rotation angle sensor, in particular a Hall effect sensor, which detects a movement of the at least one rolling element.

EEE 203. The system (500) according to EEE 202 characterized in that the sensors comprise at least one load sensor per cyber foot cover, wherein the at least one load sensor is configured to determine a load applied to the at least one rolling element.

EEE 204. The system according to any one of EEE 201-203 characterized in that the sensors comprise position sensors, optical sensors, magnetic sensors, and/or gyrometers, wherein at least one position sensor, at least one optical sensor, at least one magnetic sensor, and/or at least one gyrometer is arranged in each cyber foot cover.

EEE 205. The system (200b; 500) according to any one of EEE 201-204 characterized in that the sensors comprise at least one optical sensor (220a), in particular an infrared-based optical sensor, which is arranged decentralized in an operating mode with respect to the person using the system (200b), wherein the at least one optical sensor (220a) detects the movement of the person using the system (200b; 500).

EEE 206. The system (500) according to any one of EEE 201-205 characterized in that the sensors comprise pressure sensors and/or proximity sensors (78), wherein at least one pressure sensor and/or at least one proximity sensor (78) is/are implemented per cyber foot cover (50d) and wherein the at least one pressure sensor and/or the at least one proximity sensor (78) is/are arranged in a longitudinal direction in a front region (52) of the cyber foot cover (50d).

EEE 207. A method for controlling movements of a virtual avatar with a system (500) according to EEE 205 or EEE 206, characterized in that the virtual avatar is controlled, by the central control means (12), to move laterally upon detecting, by the sensors, an X component of the movements of the feet of the person using the system (500) and upon detecting a distance between a front region (52) of the cyber foot cover (50d) and the ground.

EEE 208. The method according to EEE 207 characterized in that the cyber foot cover (50d) is controlled, by the central control means (12), to rotate the virtual avatar laterally upon detecting, by the sensors, an X component of the movement of the feet of the person using the system (500) and upon detecting a zero distance between the front region (52) and the ground.

EEE 209. The method according to EEE 207 or EEE 208 characterized in that the virtual avatar is controlled, by the central control means (12), to move laterally in the presence of at least one rolling element and a load sensor which determines the load on the at least one rolling element, and upon detecting, by the sensors, an X component of the movement of the feet of the person using the system (500) and upon detecting a load on the at least one rolling element of approximately zero.

EEE 210. The method according to any one of EEE 207-209 characterized in that the virtual avatar is controlled, by the central control means (10; 12, to move laterally upon detecting, by the sensors, an X component of the movement of the feet of the person using the system (500) and upon detecting, by the sensors, that the person using the system (500) sitting at the seat is performing substantially no rotational movement relative to the ground.

EEE 211. The method according to any one of EEE 207-210 characterized in that the virtual avatar is controlled, by the central control means (12), to move laterally upon detecting, by the sensors, an X component of the movement of the feet of the person using the system (500) and upon detecting a Y component of substantially zero.

EEE 212. The method according to any one of EEE 207-211, characterized in that the virtual avatar is controlled, by the central control means (10; 12), to move laterally upon detecting, by the sensors, an X component of the movement of the feet of the person using the system (500) and upon detecting, by the sensors, substantially rectangular tilted legs.

The invention claimed is:

1. An apparatus for detecting movements of a person using the apparatus, comprising:
   cyber foot covers each cyber foot cover comprising:
      a foot cover for receiving at least one sensor, or at least one marker to track the movement of the foot,
      fastening means with which the foot cover is attachable to the leg of the person using the apparatus, and
      a sole which is curved so as to allow a continuously sliding rolling movement of the foot of the person using the apparatus during movement of the leg of the person using the apparatus, and
   a seat having a support member adapted in that:
      a seat element, on which the person using the apparatus can sit, is attachable to an upper part of the support member, and
      the load of the seat element is received substantially along a vertically arranged longitudinal axis of the support member and transferred downwards to a ground,
      wherein the seat (110; 210; 410) is rotatably arranged relative to the ground,
      wherein the seat (110; 210; 410) is designed to allow at least a movement of the legs from the knee to the distal end of the legs of the person using the apparatus,
      wherein the seat is adapted to provide an elevated sitting position of the person, thereby establishing a feeling of walking when moving the legs even though the person is sitting with a slight angulation of the legs, and
      wherein the curvature of the sole in at least one of the longitudinal or transverse direction is adapted to match the design of the seat in order to provide a smooth rolling motion of the feet when moving the legs, and wherein the stability of the person is achieved by the elevated sitting position.

2. The apparatus according to claim 1, wherein the seat is adapted to provide an elevated sitting position of the person, thereby establishing a feeling of walking when moving the legs even though the person is sitting with a slight angulation of the legs.

3. The apparatus according to claim 1, characterized in that the apparatus further comprises the seat element, wherein the seat element is shaped such that the upper thighs of the person using the apparatus substantially do not rest on the seat element.

* * * * *